(12) United States Patent
Chesneau et al.

(10) Patent No.: US 9,722,280 B2
(45) Date of Patent: Aug. 1, 2017

(54) ACRYLONITRILE DERIVATIVES AS ADDITIVE FOR ELECTROLYTES IN LITHIUM ION BATTERIES

(71) Applicant: BASF SE, Ludwigshafen (DE)

(72) Inventors: Frederick Francois Chesneau, St. Leon-Rot (DE); Zoltan Baan, Maxdorf (DE); Boris Gaspar, Mannheim (DE); Michael Schmidt, Seeheim-Jugenheim (DE); Arnd Garsuch, Ludwigshafen (DE); Hannes Wolf, Ludwigshafen (DE); Klaus Leitner, Ludwigshafen (DE); Christian Saffert, Wachenheim (DE); Wolfgang Klaus, Ludwigshafen (DE); Melanie Kuhl, Heuchelheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/905,606

(22) PCT Filed: Jul. 7, 2014

(86) PCT No.: PCT/EP2014/064448
§ 371 (c)(1),
(2) Date: Jan. 15, 2016

(87) PCT Pub. No.: WO2015/007555
PCT Pub. Date: Jan. 22, 2015

(65) Prior Publication Data
US 2016/0164141 A1    Jun. 9, 2016

(30) Foreign Application Priority Data
Jul. 15, 2013    (EP) .................... 13176496

(51) Int. Cl.
| | | |
|---|---|---|
| H01M 10/0567 | (2010.01) | |
| H01M 10/0568 | (2010.01) | |
| H01M 10/0525 | (2010.01) | |
| H01M 4/505 | (2010.01) | |
| H01M 4/525 | (2010.01) | |
| H01M 4/587 | (2010.01) | |
| H01M 10/0569 | (2010.01) | |
| H01M 2/16 | (2006.01) | |
| H01M 4/131 | (2010.01) | |
| H01M 4/133 | (2010.01) | |
| H01M 4/62 | (2006.01) | |
| H01M 4/66 | (2006.01) | |
| H01M 4/02 | (2006.01) | |
| H01M 4/04 | (2006.01) | |
| H01M 4/1391 | (2010.01) | |

(52) U.S. Cl.
CPC ..... *H01M 10/0567* (2013.01); *H01M 2/1613* (2013.01); *H01M 4/131* (2013.01); *H01M 4/133* (2013.01); *H01M 4/505* (2013.01); *H01M 4/525* (2013.01); *H01M 4/587* (2013.01); *H01M 4/625* (2013.01); *H01M 4/661* (2013.01); *H01M 10/0525* (2013.01); *H01M 10/0568* (2013.01); *H01M 10/0569* (2013.01); *H01M 4/0404* (2013.01); *H01M 4/1391* (2013.01); *H01M 2004/027* (2013.01); *H01M 2004/028* (2013.01); *H01M 2220/10* (2013.01); *H01M 2220/20* (2013.01); *H01M 2220/30* (2013.01)

(58) Field of Classification Search
CPC ......... H01M 10/0567; H01M 10/0568; H01M 10/0569; H01M 4/131; H01M 4/1393; H01M 10/0525; H01M 4/133; H01M 4/505; H01M 4/525; H01M 4/587; H01M 4/625; H01M 4/661; H01M 2300/0017; H01M 2300/0025
See application file for complete search history.

(56) References Cited

U.S. PATENT DOCUMENTS

| | | |
|---|---|---|
| 6,413,678 B1 | 7/2002 | Hamamoto et al. |
| 7,008,728 B2 | 3/2006 | Kim et al. |

(Continued)

FOREIGN PATENT DOCUMENTS

| | | |
|---|---|---|
| EP | 0 683 587 A1 | 11/1995 |
| EP | 2 120 279 A1 | 11/2009 |

(Continued)

OTHER PUBLICATIONS

Varsha, G., Arun, V., Sebastian, M., Leeju, P., Varghese, D., Yusuff, K.K.M.-(Z)-2-Amino-3-((E)-benzylideneamino)-but-2-enedintrile, Acta Crystallografica, E65, 2009.*

(Continued)

*Primary Examiner* — Anca Eoff
(74) *Attorney, Agent, or Firm* — Oblon, McClelland, Maier & Neustadt, L.L.P.

(57) ABSTRACT

An electrolyte composition (A) containing (i) at least one aprotic organic solvent; (ii) at least one conducting salt; (iii) at least one compound of formula $(NC)(A^1X^1)C=C(X^2A^2)(CN)$ wherein $X^1$ and $X^2$ are independently from each other selected from $N(R')$, $P(R^1)$, O, and S, and $A^1$ and $A^2$ are selected from H or organic substituents; and electrochemical cells containing electrolyte composition (A).

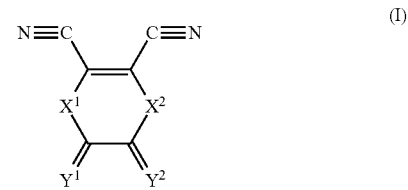

20 Claims, No Drawings

(56) References Cited

U.S. PATENT DOCUMENTS

| | | | |
|---|---|---|---|
| 2004/0013946 A1 | 1/2004 | Abe et al. | |
| 2006/0194118 A1 | 8/2006 | Yew et al. | |
| 2008/0020287 A1* | 1/2008 | Cho | H01M 10/0567 429/339 |
| 2011/0207000 A1 | 8/2011 | Jow et al. | |
| 2013/0004861 A1 | 1/2013 | Yu et al. | |
| 2014/0315079 A1* | 10/2014 | Schmidt | C07D 233/90 429/188 |

FOREIGN PATENT DOCUMENTS

| | | |
|---|---|---|
| JP | 2003-86248 A | 3/2003 |
| JP | 2012-195223 A | 10/2012 |
| WO | WO 2012/029386 A1 | 3/2012 |
| WO | WO 2013/072591 * | 5/2013 |

OTHER PUBLICATIONS

H.J. Santner, et al., "Acrylic acid nitrile, a film-forming electrolyte component for lithium-ion batteries, which belongs to the family of additives containing vinyl groups", Journal of Power Sources 119-121, 2003, pp. 368-372.

Ran Elazari, et al., "Rechargeable lithiated silicon-sulfur (SLS) battery prototypes", Electrochemistry Communications 14, 2012, pp. 21-24.

International Search Report issued Aug. 20, 2014 in PCT/EP2014/064448.

International Preliminary Report on Patentability and Written Opinion issued Jan. 19, 2016 in PCT/EP2014/064448.

Shen Shui Zhang, "A review on electrolyte additives for lithium-ion batteries" Journal of Power Sources, vol. 162, XP027938606, 2006, pp. 1379-1394.

* cited by examiner

ACRYLONITRILE DERIVATIVES AS ADDITIVE FOR ELECTROLYTES IN LITHIUM ION BATTERIES

The present invention relates to an electrolyte composition (A) containing
(i) at least one aprotic organic solvent;
(ii) at least one conducting salt;
(iii) at least one compound of formula (I)

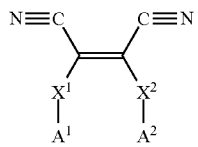

wherein
$X^1$, $X^2$, $A^1$, and $A^2$ are defined below, and
(iv) optionally, at least one further additive.

The present invention further relates to the use of compounds of formula (I) as additives for electrolytes in electrochemical cells and to electrochemical cells comprising the above described electrolyte composition (A), at least one cathode (B) comprising at least one cathode active material, and at least one anode (C) comprising at least one anode active material.

Storing electrical energy is a subject of still growing interest. Efficient storage of electric energy would allow electric energy to be generated when it is advantageous and used when needed.

Accumulators, for example lead accumulators and nickel-cadmium accumulators, have been known for many decades. The known lead accumulators and nickel-cadmium accumulators have the disadvantages, however, of a comparatively low energy density and of a memory effect which reduces the rechargeability and hence the useful life of lead accumulators and nickel-cadmium accumulators.

Lithium ion accumulators, frequently also referred to as lithium ion batteries, are used as an alternative. They provide higher energy densities than accumulators based on lead or comparatively noble heavy metals.

Since many lithium ion batteries utilize metallic lithium or lithium in oxidation state 0, or produce it as an intermediate, they are water sensitive. Moreover, the conductive salts used, for example $LiFP_6$, are water sensitive during long-term operation. Water is therefore not a usable solvent for the lithium salts used in lithium ion batteries. Instead, organic carbonates, ethers, esters and ionic liquids are used as sufficiently polar solvents. Most state of the art lithium ion batteries in general comprise not a single solvent but a solvent mixture of different organic aprotic solvents.

During charge and discharge of lithium ion batteries various reactions take place at different cell potentials. It is known that during the first charging process of a lithium ion battery usually a film is formed on the anode. This film is often called solid electrolyte interface (SEI). The SEI is permeable for lithium ions and protects the electrolyte from direct contact with the anode and vice versa. It is formed by reductive decomposition of components of the electrolyte composition like solvents, e.g. carbonates, esters, and ethers, and conductive salts on the surface of the anode, especially if the anode active material is a carbonaceous material like graphite. A certain amount of the lithium from the cathode is irreversibly consumed for the formation of the SEI and cannot be replaced. One possibility to reduce the amount of irreversibly consumed lithium is the addition of suitable chemical compounds which are easily decomposed on the anode by reduction and thereby forming a film on the surface of the anode. One especially well suited compound is vinylene carbonate, see for instance EP 0 683 587 B1 and U.S. Pat. No. 6,413,678 B1. Vinylene carbonate forms a stable SEI on a graphite anode in lithium ion batteries.

Other film forming additives are known, inter alia acrylonitrile and derivatives thereof. Santner et al., J. Power Sources, 2003, 119 to 121, pages 368 to 372 reports the use of acrylonitrile in propylene carbonate as film forming additive in lithium ion secondary batteries having a graphite anode and $LiMn_2O_4$ as cathode active material. US2006/0194118 A1 discloses electrolyte composition for lithium ion batteries containing at least one first additive capable o forming a chelating complex with a transition metal and being stale at voltages ranging from about 2.5 to 4.8 V. Said first additive may be inter alia 1,2-dicyanoethylene or 1,2-dicyanobenzene. JP 2012195223 A2 discloses the use of substituted benzonitrile derivatives in electrolytes for lithium ion batteries. From EP 2 120 279 A1 electrolytic solutions for secondary batteries containing acrylonitrile derivatives like methacrylonitrile, 2-furonitrile, fumaronitrile and tetracyanoethylene are known. U.S. Pat. No. 7,008,728 B2 describes electrolytes for lithium secondary batteries containing acrylonitrile or derivatives thereof as additives forming an organic SEI on the negative electrode during initial charging. US 2004/0013946 A1 is directed to non-aqueous electrolytic solutions for lithium batteries containing at least one nitrile compound like actetonitrile or 1,2-dicyanobenzene and at least on S=O group containing compound. WO 2012/029386 A1 discloses lithium ion batteries containing acrylonitrile compounds in the electrolyte composition, e.g. 2-furonitrile. From US 2011/207000A1 the use of benzonitrile derivatives, in particular of fluorinated benzonitriles as additives in electrolytes for electrochemical cells is known. JP 2003-086248 A concerns electrolytic solutions for secondary batteries containing compounds having an electrophilic group conjugated with a carbon-carbon unsaturated bond. These compounds may inter alia be selected from acrylonitrile, methacrylonitrile and 2-cyanoacrylic acid ethyl ester.

Nevertheless there is still the need for enhancing the lifetime of secondary batteries and a demand for electrolyte additives leading to a prolonged life time and cycle stability of secondary lithium ion batteries.

It was an object of the present invention to provide an electrolyte composition leading to an improved lifetime of lithium ion batteries. A further object of the present invention was to provide lithium ion batteries of high energy density and/or higher operating voltage having good performance characteristics and long lifetime.

This object is achieved by an electrolyte composition (A) containing
(i) at least one aprotic organic solvent;
(ii) at least one conducting salt;
(iii) at least one compound of formula (I)

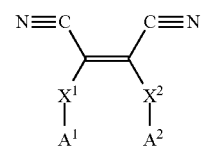

wherein
X$^1$ and X$^2$ are independently from each other selected from N(R$^1$), N=C(R$^2$)—, P(R$^1$), O, and S;
R$^1$ is selected from H, C$_1$-C$_{10}$ alkyl, C$_3$-C$_6$ (hetero)cycloalkyl, C$_2$-C$_{10}$ alkenyl, C$_3$-C$_6$ (hetero)cycloalkenyl, C$_2$-C$_6$ alkynyl, C$_5$-C$_7$ (hetero)aryl, C$_7$-C$_{13}$ aralkyl, OR$^3$, C(O)R$^3$, C(NR$^3$)R$^4$, and C(O)OR$^3$, wherein alkyl, (hetero)cycloalkyl, alkenyl, (hetero)cycloalkenyl, alkynyl, (hetero)aryl, and aralkyl may be substituted by one or more substituents selected from F, CN, C$_1$-C$_6$ alkyl, C$_3$-C$_6$ (hetero)cycloalkyl, C$_2$-C$_6$ alkenyl, C$_5$-C$_7$ (hetero)aryl, S(O)$_2$OR$^{3a}$, OS(O)$_2$R$^{3a}$, S(O)$_2$R$^{3a}$, OR$^{3a}$, C(O)R$^{3a}$, C(O)OR$^{3a}$, NR$^{3a}$R$^{3b}$, and NC(O)R$^{3a}$R$^{3b}$;
R$^2$ is selected from H, CN, F, C$_1$-C$_{10}$ alkyl, C$_3$-C$_6$ (hetero)cycloalkyl, C$_2$-C$_{10}$ alkenyl, C$_3$-C$_6$ (hetero)cycloalkenyl, C$_2$-C$_6$ alkynyl, C$_5$-C$_7$ (hetero)aryl, C$_7$-C$_{13}$ aralkyl, S(O)$_2$OR$^3$, OS(O)$_2$R$^3$, S(O)$_2$R$^3$, OR$^3$, C(O)R$^3$, C(NR$^3$)R$^4$, C(O)OR$^3$, NR$^3$R$^4$, NC(O)R$^3$, P(O)R$^3$R$^4$, and SiR$^3$R$^4$R$^5$, wherein alkyl, (hetero)cycloalkyl, alkenyl, (hetero)cycloalkenyl, alkynyl, (hetero)aryl, and aralkyl may be substituted by one or more substituents selected from F, CN, C$_1$-C$_6$ alkyl, C$_3$-C$_6$ (hetero)cycloalkyl, C$_2$-C$_6$ alkenyl, C$_5$-C$_7$ (hetero)aryl, S(O)$_2$OR$^{3a}$, OS(O)$_2$R$^{3a}$, S(O)$_2$R$^{3a}$, OR$^{3a}$, C(O)R$^{3a}$, C(O)OR$^{3a}$, NR$^{3a}$R$^{3b}$, and NC(O)R$^{3a}$R$^{3b}$;
R$^3$, R$^4$, R$^5$, R$^{3a}$, and R$^{3b}$ are independently from each other selected from H, C$_1$-C$_{10}$ alkyl, C$_3$-C$_6$ (hetero)cycloalkyl, C$_2$-C$_{10}$ alkenyl, C$_3$-C$_6$ (hetero)cycloalkenyl, C$_2$-C$_6$ alkynyl, C$_5$-C$_7$ (hetero)aryl, and C$_7$-C$_{13}$ aralkyl, wherein alkyl, (hetero)cycloalkyl, alkenyl, (hetero)cycloalkenyl, alkynyl, (hetero)aryl, and aralkyl may be substituted by one or more substituents selected from F, CN, C$_1$-C$_6$ alkyl, C$_3$-C$_6$ (hetero)cycloalkyl, C$_2$-C$_6$ alkenyl, C$_5$-C$_7$ (hetero)aryl, S(O)$_2$OR$^{3c}$, OS(O)$_2$R$^{3c}$, S(O)$_2$R$^{3c}$, OR$^{3c}$, C(O)R$^{3c}$, C(O)OR$^{3c}$, NR$^{3c}$R$^{3d}$, and NC(O)R$^{3c}$R$^{3d}$;
R$^{3c}$ and R$^{3d}$ are selected independently from each other from H, C$_1$-C$_{10}$ alkyl, C$_3$-C$_6$ (hetero)cycloalkyl, C$_2$-C$_{10}$ alkenyl, and C$_5$-C$_7$ (hetero)aryl, wherein alkyl, (hetero)cycloalkyl, alkenyl, and (hetero)aryl may be substituted by one or more substituents selected from F and CN;
A$^1$ is selected from C$_1$-C$_{10}$ alkyl, C$_3$-C$_6$ (hetero)cycloalkyl, C$_2$-C$_{10}$ alkenyl, C$_3$-C$_6$ (hetereo)cycloalkenyl, C$_2$-C$_6$ alkynyl, C$_5$-C$_7$ (hetero)aryl, C$_7$-C$_{13}$ aralkyl, OR$^6$, C(O)R$^6$, C(NR$^6$)R$^7$ and C(O)OR$^6$, wherein alkyl, (hetero)cycloalkyl, alkenyl, (hetero)cycloalkenyl, alkynyl, (hetero)aryl, and aralkyl may be substituted by one or more substituents selected from F, CN, C$_1$-C$_6$ alkyl, C$_3$-C$_6$ (hetero)cycloalkyl, C$_2$-C$_6$ alkenyl, C$_5$-C$_7$ (hetero)aryl, S(O)$_2$OR$^{6a}$, OS(O)$_2$R$^{6a}$, S(O)$_2$R$^{6a}$, OR$^{6a}$, C(O)OR$^{6a}$, NR$^{6a}$R$^{6b}$, and NC(O)R$^{6a}$R$^{6b}$;
A$^2$ is selected from H, C$_1$-C$_{10}$ alkyl, C$_3$-C$_6$ (hetero)cycloalkyl, C$_2$-C$_{10}$ alkenyl, C$_3$-C$_6$ (hetero)cycloalkenyl, C$_2$-C$_6$ alkynyl, C$_5$-C$_7$ (hetero)aryl, C$_7$-C$_{13}$ aralkyl, OR$^6$, C(O)R$^6$, C(NR$^6$)R$^7$ and C(O)OR$^6$, wherein alkyl, (hetero)cycloalkyl, alkenyl, (hetero)cycloalkenyl, alkynyl, (hetero)aryl, and aralkyl may be substituted by one or more substituents selected from F, CN, C$_1$-C$_6$ alkyl, C$_3$-C$_6$ (hetero)cycloalkyl, C$_2$-C$_6$ alkenyl, C$_5$-C$_7$ (hetero)aryl, S(O)$_2$OR$^{6a}$, OS(O)$_2$R$^{6a}$, S(O)$_2$R$^{6a}$, OR$^{6a}$, C(O)OR$^{6a}$, NR$^{6a}$R$^{6b}$, and NC(O)R$^{6a}$R$^{6b}$ with the proviso that in case of X$^2$ is O or S, A$^2$ is neither H nor OR$^6$;
R$^6$, R$^7$, R$^{6a}$, and R$^{6b}$ are independently from each other selected from H, C$_1$-C$_{10}$ alkyl, C$_5$-C$_6$ (hetero)cycloalkyl, C$_2$-C$_{10}$ alkenyl, C$_3$-C$_6$ (hetereo)cycloalkenyl, C$_2$-C$_6$ alkynyl, C$_5$-C$_7$ (hetero)aryl, and C$_7$-C$_{13}$ aralkyl, wherein alkyl, (hetero)cycloalkyl, alkenyl, (hetero)cycloalkenyl, alkynyl, (hetero)aryl, and aralkyl may be substituted by one or more substituents selected from F, CN, C$_1$-C$_6$ alkyl, C$_3$-C$_6$ (hetero)cycloalkyl, C$_2$-C$_6$ alkenyl, C$_5$-C$_7$ (hetero)aryl, S(O)$_2$OR$^{6c}$, OS(O)$_2$R$^{6c}$, S(O)$_2$R$^{6c}$, OR$^{6c}$, C(O)R$^{6c}$, C(O)OR$^{6c}$, NR$^{6c}$R$^{6d}$, and NC(O)R$^{6c}$R$^{6d}$;
R$^{6c}$ and R$^{6d}$ are independently from each other selected from H, C$_1$-C$_{10}$ alkyl, C$_3$-C$_6$ (hetero)cycloalkyl, C$_2$-C$_{10}$ alkenyl, and C$_5$-C$_7$ (hetero)aryl, wherein alkyl, (hetero)cycloalkyl, alkenyl, and (hetero)aryl may be substituted by one or more substituents selected from F and CN; and
(iv) optionally at least one further additive.

The problem is further solved by the use of at least one compound of formula (I) as additive for electrolytes in electrochemical cells; and by the electrochemical cell comprising the electrolyte composition (A) as described above, at least one cathode (B) comprising at least one cathode active material, and at least one anode (C) comprising at least one anode active material.

The addition of at least one compound of general formula (I) to an electrolyte for lithium ion secondary batteries comprising at least one aprotic organic solvent or a mixture thereof and at least one conducting salt leads to improved capacity retention of the lithium secondary ion batteries.

The inventive electrolyte composition (A) is preferably liquid at working conditions; more preferred it is liquid at 1 bar and 25° C., even more preferred the electrolyte composition is liquid at 1 bar and −15° C., in particular the electrolyte composition is liquid at 1 bar and −30° C., even more preferred the electrolyte composition is liquid at 1 bar and −50° C.

The electrolyte composition (A) contains at least one aprotic organic solvent (i), preferably at least two aprotic organic solvents (i). According to one embodiment the electrolyte composition (A) may contain up to ten aprotic organic solvents (i).

The at least one aprotic organic solvent (i) is preferably selected from
(a) cyclic and noncyclic organic carbonates, which may be partly halogenated,
(b) di-C$_1$-C$_{10}$-alkylethers, which may be partly halogenated,
(c) di-C$_1$-C$_4$-alkyl-C$_2$-C$_6$-alkylene ethers and polyethers, which may be partly halogenated,
(d) cyclic ethers, which may be partly halogenated,
(e) cyclic and acyclic acetals and ketals, which may be partly halogenated,
(f) orthocarboxylic acids esters, which may be partly halogenated,
(g) cyclic and noncyclic esters of carboxylic acids, which may be partly halogenated,
(h) cyclic and noncyclic sulfones, which may be partly halogenated,
(i) cyclic and noncyclic nitriles and dinitriles, which may be partly halogenated, and
(j) ionic liquids, which may be partly halogenated.

More preferred the at least one aprotic organic solvent (i) is selected from cyclic and noncyclic organic carbonates (a), di-C$_1$-C$_{10}$-alkylethers (b), di-C$_1$-C$_4$-alkyl-C$_2$-C$_6$-alkylene ethers and polyethers (c) and cyclic and acyclic acetals and ketals (e), even more preferred electrolyte composition (A) contains at least one aprotic organic solvent (i) selected from cyclic and noncyclic organic carbonates (a) and most preferred electrolyte composition (A) contains at least two aprotic organic solvents (i) selected from cyclic and noncyclic organic carbonates (a), in particular preferred electrolyte composition (A) contains at least one aprotic solvent (i) selected from cyclic organic carbonates and at least one aprotic organic solvent (i) selected from noncyclic organic carbonates.

The aprotic organic solvents (a) to (j) may be partly halogenated, e.g. they may be partly fluorinated, partly chlorinated or partly brominated, preferably they may be partly fluorinated. "Partly halogenated" means, that one or more H of the respective molecule is substituted by a halogen atom, e.g. by F, Cl or Br. Preference is given to the substitution by F. The at least one solvent (i) may be selected from partly halogenated and non-halogenated aprotic organic solvents (a) to (j), i.e. the electrolyte composition may contain a mixture of partly halogenated and non-halogenated aprotic organic solvents.

Examples of suitable organic carbonates (a) are cyclic organic carbonates according to the general formula (a1), (a2) or (a3)

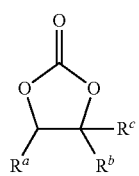
(a1)

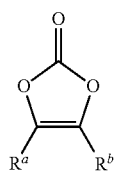
(a2)

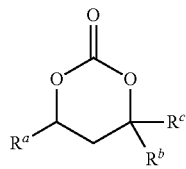
(a3)

wherein
$R^a$, $R^b$ and $R^c$ being different or equal and being independently from each other selected from hydrogen; $C_1$-$C_4$-alkyl, preferably methyl; F; and $C_1$-$C_4$-alkyl substituted by one or more F, e.g. $CF_3$.

"$C_1$-$C_4$-alkyl" is intended to include methyl, ethyl, n-propyl, iso-propyl, n-butyl, iso-butyl, sec.-butyl and tert.-butyl.

Preferred cyclic organic carbonates (a) are of general formula (a1), (a2) or (a3) wherein $R^a$, $R^b$ and $R^c$ are H. Examples are ethylene carbonate, vinylene carbonate, and propylene carbonate. A preferred cyclic organic carbonate (a) is ethylene carbonate. Further preferred cyclic organic carbonates (a) are difluoroethylene carbonate (a4) and monofluoroethylene carbonate (a5)

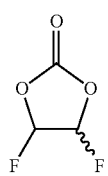
(a4)

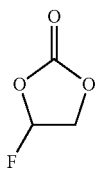
(a5)

Examples of suitable non-cyclic organic carbonates (a) are dimethyl carbonate, diethyl carbonate, methylethyl carbonate and mixtures thereof.

In one embodiment of the invention the electrolyte composition (A) contains mixtures of non-cyclic organic carbonates (a) and cyclic organic carbonates (a) at a ratio by weight of from 1:10 to 10:1, preferred of from 3:1 to 1:3.

Examples of suitable non-cyclic di-$C_1$-$C_{10}$-alkylethers (b) are dimethylether, ethylmethylether, diethylether, diisopropylether, and di-n-butylether.

Examples of di-$C_1$-$C_4$-alkyl-$C_2$-$C_6$-alkylene ethers (c) are 1,2-dimethoxyethane, 1,2-diethoxyethane, diglyme (diethylene glycol dimethyl ether), triglyme (triethylenglycol dimethyl ether), tetraglyme (tetraethylenglycol dimethyl ether), and diethylenglycoldiethylether.

Examples of suitable polyethers (c) are polyalkylene glycols, preferably poly-$C_1$-$C_4$-alkylene glycols and especially polyethylene glycols. Polyethylene glycols may comprise up to 20 mol % of one or more $C_1$-$C_4$-alkylene glycols in copolymerized form. Polyalkylene glycols are preferably dimethyl- or diethyl-end capped polyalkylene glycols. The molecular weight $M_w$ of suitable polyalkylene glycols and especially of suitable polyethylene glycols may be at least 400 g/mol. The molecular weight $M_w$ of suitable polyalkylene glycols and especially of suitable polyethylene glycols may be up to 5 000 000 g/mol, preferably up to 2 000 000 g/mol.

Examples of suitable cyclic ethers (d) are tetrahydrofurane and 1,4-dioxane.

Examples of suitable non-cyclic acetals (e) are 1,1-dimethoxymethane and 1,1-diethoxymethane. Examples for suitable cyclic acetals (e) are 1,3-dioxane and 1,3-dioxolane.

Examples of suitable orthocarboxylic acids esters (f) are tri-$C_1$-$C_4$ alkoxy methane, in particular trimethoxymethane and triethoxymethane.

Examples of suitable noncyclic esters of carboxylic acids (g) are ethyl acetate, methyl butanoate, and esters of dicarboxylic acids like 1,3-dimethyl propanedioate. An example of a suitable cyclic ester of carboxylic acids (lactones) is γ-butyrolactone.

Examples of suitable cyclic and noncyclic sulfones (h) are ethyl methyl sulfone and tetrahydrothiophene-1,1-dioxide.

Examples of suitable cyclic and noncyclic nitriles and dinitriles (i) are adiponitrile, acetonitrile, propionitrile, butyronitrile.

The water content of the inventive electrolyte composition is preferably below 100 ppm, based on the weight of the electrolyte composition, more preferred below 50 ppm, most preferred below 30 ppm. The water content may be determined by titration according to Karl Fischer, e.g. described in detail in DIN 51777 or ISO760: 1978.

The content of HF of the inventive electrolyte composition is preferably below 60 ppm, based on the weight of the electrolyte composition, more preferred below 40 ppm, most preferred below 20 ppm. The HF content may be determined by titration according to potentiometric or potentiographic titration method.

The inventive electrolyte composition (A) furthermore contains at least one conducting salt (ii). Electrolyte composition (A) functions as a medium that transfers ions participating in the electrochemical reaction taking place in an electrochemical cell. The conducting salt(s) (ii) present in the electrolyte are usually solvated in the aprotic organic solvent(s) (i). Preferably the conducting salt (ii) is a lithium salt. The conducting salt is preferably selected from the group consisting of Li[$F_{6-x}P(C_yF_{2y+1})_x$], wherein x is an integer in the range from 0 to 6 and y is an integer in the range from 1 to 20;

Li[B($R^I$)$_4$], Li[B($R^I$)$_2$(OR$^{II}$O)] and Li[B(OR$^{II}$O)$_2$] wherein each $R^I$ is independently from each other selected from F, Cl, Br, I, $C_1$-$C_4$ alkyl, $C_2$-$C_4$ alkenyl, and $C_2$-$C_4$ alkynyl, wherein alkyl, alkenyl, and alkynyl may be substituted by one or more OR$^{III}$, wherein $R^{III}$ is selected from $C_1$-$C_6$ alkyl, $C_2$-$C_6$ alkenyl, and $C_2$-$C_6$ alkynyl, and (OR$^{II}$O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via the both oxygen atoms with the central B-atom;

LiClO$_4$; LiAsF$_6$; LiCF$_3$SO$_3$; Li$_2$SiF$_6$; LiSbF$_6$; LiAlCl$_4$; lithium tetrafluoro (oxalato) phosphate; lithium oxalate; and salts of the general formula Li[Z($C_nF_{2n+1}SO_2$)$_m$], where m and n are defined as follows:
m=1 when Z is selected from oxygen and sulfur,
m=2 when Z is selected from nitrogen and phosphorus,
m=3 when Z is selected from carbon and silicon, and
n is an integer in the range from 1 to 20.

Suited 1,2- and 1,3-diols from which the bivalent group (OR$^{II}$O) is derived may be aliphatic or aromatic and may be selected, e.g., from 1,2-dihydroxybenzene, propane-1,2-diol, butane-1,2-diol, propane-1,3-diol, butan-1,3-diol, cyclohexyl-trans-1,2-diol and naphthalene-2,3-diol which are optionally are substituted by one or more F and/or by at least one straight or branched non fluorinated, partly fluorinated or fully fluorinated $C_1$-$C_4$ alkyl group. An example for such 1,2- or 1,3-diole is 1,1,2,2-tetra(trifluoromethyl)-1,2-ethane diol.

"Fully fluorinated $C_1$-$C_4$ alkyl group" means, that all H-atoms of the alkyl group are substituted by F.

Suited 1,2- or 1,3-dicarboxlic acids from which the bivalent group (OR$^{II}$O) is derived may be aliphatic or aromatic, for example oxalic acid, malonic acid (propane-1,3-dicarboxylic acid), phthalic acid or isophthalic acid, preferred is oxalic acid. The 1,2- or 1,3-dicarboxlic acid are optionally substituted by one or more F and/or by at least one straight or branched non fluorinated, partly fluorinated or fully fluorinated $C_1$-$C_4$ alkyl group.

Suited 1,2- or 1,3-hydroxycarboxylic acids from which the bivalent group (OR$^{II}$O) is derived may be aliphatic or aromatic, for example salicylic acid, tetrahydro salicylic acid, malic acid, and 2-hydroxy acetic acid, which are optionally substituted by one or more F and/or by at least one straight or branched non fluorinated, partly fluorinated or fully fluorinated $C_1$-$C_4$ alkyl group. An example for such 1,2- or 1,3-hydroxycarboxylic acids is 2,2-bis(trifluoromethyl)-2-hydroxy-acetic acid.

Examples of Li[B($R^I$)$_4$], Li[B($R^I$)$_2$(OR$^{II}$O)] and Li[B(OR$^{II}$O)$_2$] are LiBF$_4$, lithium difluoro oxalato borate and lithium dioxalato borate.

Preferably the at least one conducting salt (ii) is selected from LiAsF$_6$, Li[N(FSO$_2$)$_2$], Li[N(CF$_3$SO$_2$)$_2$], LiClO$_4$, LiPF$_6$, LiBF$_4$, and LiPF$_3$(CF$_2$CF$_3$)$_3$, more preferred the conducting salt (ii) is selected from LiPF$_6$ and LiBF$_4$, and the most preferred conducting salt (ii) is LiPF$_6$.

The at least one conducting salt (ii) is usually present at a minimum concentration of at least 0.01 wt.-%, preferably of at least 1 wt.-%, and more preferred of at least 5 wt.-%, based on the total weight of the electrolyte composition. Usually the upper concentration limit for the at least one conducting salt (ii) is 25 wt.-%, based on the total weight of the electrolyte composition.

The inventive electrolyte composition (A) contains as component (iii) at least one compound of formula (I)

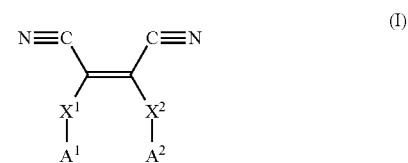

wherein $X^1$ and $X^2$ are independently from each other selected from N($R^1$), N=C($R^2$), P($R^1$), O, and S; preferably $X^1$ and $X^2$ are independently from each other selected from N($R^1$), N=C($R^2$) and O;

$R^1$ is selected from H, $C_1$-$C_{10}$ alkyl, $C_3$-$C_6$ (hetero)cycloalkyl, $C_2$-$C_6$ alkenyl, $C_3$-$C_6$ (hetero)cycloalkenyl, $C_2$-$C_6$ alkynyl, $C_5$-$C_7$ (hetero)aryl, $C_7$-$C_{13}$ aralkyl, OR$^3$, C(O)R$^3$, C(NR$^3$)R$^4$, and C(O)OR$^3$, wherein alkyl, (hetero)cycloalkyl, alkenyl, (hetero)cycloalkenyl, alkynyl, (hetero)aryl, and aralkyl may be substituted by one or more substituents selected from F, CN, $C_1$-$C_6$ alkyl, $C_3$-$C_6$ (hetero)cycloalkyl, $C_2$-$C_6$ alkenyl, $C_5$-$C_7$ (hetero)aryl, S(O)$_2$OR$^{3a}$, OS(O)$_2$R$^{3a}$, S(O)$_2$R$^{3a}$, OR$^{3a}$, C(O)R$^{3a}$, C(O)OR$^{3a}$, NR$^{3a}$R$^{3b}$, and NC(O)R$^{3a}$R$^{3b}$;

$R^2$ is selected from H, CN, F, $C_{10}$-$C_6$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, $C_7$-$C_{13}$ aralkyl, S(O)$_2$OR$^3$, OS(O)$_2$R$^3$, S(O)$_2$R$^3$, OR$^3$, C(O)R$^3$, C(NR$^3$)R$^4$, C(O)OR$^3$, NR$^3$R$^4$, NC(O)R$^3$, P(O)R$^3$R$^4$, and SiR$^3$R$^4$R$^5$, wherein alkyl, (hetero)cycloalkyl, alkenyl, (hetero)cycloalkenyl, alkynyl, (hetero)aryl, and aralkyl may be substituted by one or more substituents selected from F, CN, $C_1$-$C_6$ alkyl, $C_3$-$C_6$ (hetero)cycloalkyl, $C_2$-$C_6$ alkenyl, $C_6$-$C_7$ (hetero)aryl, S(O)$_2$OR$^{3a}$, OS(O)$_2$R$^{3a}$, S(O)$_2$R$^{3a}$, OR$^{3a}$, C(O)R$^{3a}$, C(O)OR$^{3a}$, NR$^{3a}$R$^{3b}$, and NC(O)R$^{3a}$R$^{3b}$;

$R^3$, $R^4$, $R^5$, $R^{3a}$, and $R^{3b}$ are selected independently from each other from H, $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, and $C_7$-$C_{13}$ aralkyl, wherein alkyl, (hetero)cycloalkyl, alkenyl, (hetero)cycloalkenyl, alkynyl, (hetero)aryl, and aralkyl may be substituted by one or more substituents selected from F, CN, $C_1$-$C_6$ alkyl, $C_3$-$C_6$ (hetero)cycloalkyl, $C_2$-$C_6$ alkenyl, $C_5$-$C_7$ (hetero)aryl, S(O)$_2$OR$^{3c}$, OS(O)$_2$R$^{3c}$, S(O)$_2$R$^{3c}$, OR$^{3c}$, C(O)R$^{3c}$, C(O)OR$^{3c}$, NR$^{3c}$R$^{3d}$, and NC(O)R$^{3c}$R$^{3d}$;

$R^{3c}$ and $R^{3d}$ are selected independently from each other from H, $C_1$-$C_{10}$ alkyl, $C_3$-$C_6$ (hetero)cycloalkyl, $C_2$-$C_{10}$ alkenyl, and $C_5$-$C_7$ (hetero)aryl, wherein alkyl, (hetero)cycloalkyl, alkenyl, and (hetero)aryl may be substituted by one or more substituents selected from F and CN;

A1 is selected from $C_1$-$C_{10}$ alkyl, $C_3$-$C_6$ (hetero)cycloalkyl, $C_2$-$C_{10}$ alkenyl, $C_3$-$C_6$ (hetereo)cycloalkenyl, $C_2$-$C_6$ alkynyl, $C_5$-$C_7$ (hetero)aryl, $C_7$-$C_{13}$ aralkyl, $OR^6$, $C(O)R^6$, $C(NR^6)R^7$ and $C(O)OR^6$, wherein alkyl, (hetero)cycloalkyl, alkenyl, (hetero)cycloalkenyl, alkynyl, (hetero)aryl, and aralkyl may be substituted by one or more substituents selected from F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{6a}$, $OS(O)_2R^{6a}$, $S(O)_2R^{6a}$, $OR^{6a}$, $C(O)OR^{6a}$, $NR^{6a}R^{6b}$, and $NC(O)R^{6a}R^{6b}$;

$A^2$ is selected from H, $C_1$-$C_{10}$ alkyl, $C_3$-$C_6$ (hetero)cycloalkyl, $C_2$-$C_{10}$ alkenyl, $C_3$-$C_6$ (hetereo)cycloalkenyl, $C_2$-$C_6$ alkynyl, $C_5$-$C_7$ (hetero)aryl, $C_7$-$C_{13}$ aralkyl, $OR^6$, $C(O)R^6$, $C(NR^6)R^7$ and $C(O)OR^6$, wherein alkyl, (hetero)cycloalkyl, alkenyl, (hetero)cycloalkenyl, alkynyl, (hetero)aryl, and aralkyl may be substituted by one or more substituents selected from F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{6a}$, $OS(O)_2R^{6a}$, $S(O)_2R^{6a}$, $OR^{6a}$, $C(O)OR^{6a}$, $NR^{6a}R^{6b}$, and $NC(O)R^{6a}R^{6b}$ with the proviso that in case of $X^2$ is O or S, $A^2$ is neither H nor $OR^6$;

$R^6$, $R^7$, $R^{6a}$, and $R^{6b}$ are independently from each other selected from H, $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, and $C_7$-$C_{13}$ aralkyl, wherein alkyl, (hetero)cycloalkyl, alkenyl, (hetero)cycloalkenyl, alkynyl, (hetero)aryl, and aralkyl may be substituted by one or more substituents selected from F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{6c}$, $OS(O)_2R^{6c}$, $S(O)_2R^{6c}$, $OR^{6c}$, $C(O)R^{6c}$, $C(O)OR^{6c}$, $NR^{6c}R^{6d}$, and $NC(O)R^{6c}R^{6d}$;

$R^{6c}$ and $R^{6d}$ are independently from each other selected from H, $C_1$-$C_{10}$ alkyl, $C_3$-$C_6$ (hetero)cycloalkyl, $C_2$-$C_{10}$ alkenyl, and $C_5$-$C_7$ (hetero)aryl, wherein alkyl, (hetero)cycloalkyl, alkenyl, and (hetero)aryl may be substituted by one or more substituents selected from F and CN.

The term "$C_1$-$C_{10}$ alkyl" as used herein means a straight or branched saturated hydrocarbon group with 1 to 10 carbon atoms having one free valence. Preferred examples of $C_1$-$C_{10}$ alkyl are $C_1$-$C_6$ alkyl and include, e.g., methyl, ethyl, n-propyl, isopropyl, n-butyl, sec-butyl, isobutyl, tert-butyl, n-pentyl, iso-pentyl, 2,2-dimethylpropyl, n-hexyl, iso-hexyl, 2-ethyl hexyl, n-heptyl, iso-heptyl, n-octyl, iso-octyl, n-nonyl, n-decyl and the like. Preferred are $C_1$-$C_4$ alkyl groups and most preferred are 2-propyl, methyl and ethyl. $C_1$-$C_{10}$ alkyl may be substituted by one or more groups or atoms selected from CN, F, $OR^6$, and/or one or more non-adjacent C-atoms of $C_1$-$C_{10}$ alkyl may be replaced by oxygen or sulfur. Preferably, in $C_1$-$C_{10}$ alkyl no C atoms are replaced by oxygen or sulfur.

The term "$C_3$-$C_6$ (hetero)cycloalkyl" as used herein means a cyclic saturated hydrocarbon group with 3 to 6 carbon atoms having one free valence wherein one or more C-atoms may be replaced by N, O or S. Examples of $C_3$-$C_6$ cycloalkyl include cyclopropyl, cyclobutyl, cyclopentyl and cyclohexyl, preferred is cyclohexyl. Examples of $C_3$-$C_6$ hetero cycloalkyl are oxiranyl and tetrahydrofuryl, preferred is oxiranyl.

The term "$C_2$-$C_{10}$ alkenyl" as used herein refers to an unsaturated straight or branched hydrocarbon group with 2 to 10 carbon atoms having one free valence. Unsaturated means that the alkenyl group contains at least one C=C double bond. Preferred examples of $C_2$-$C_{10}$ alkenyl are $C_2$-$C_6$ alkenyl including for example ethenyl (vinyl), 1-propenyl, 2-propenyl, 1-n-butenyl, 2-n-butenyl, iso-butenyl, 1-pentenyl, 1-hexenyl and the like. Preferred are $C_2$-$C_4$alkenyl groups and in particular ethenyl and propenyl, the preferred propenyl is 1-propen-3-yl, also called allyl.

The term "$C_3$-$C_6$ (hetero)cycloalkenyl" as used herein refers to a cyclic unsaturated hydrocarbon group with 3 to 6 carbon atoms having one free valence wherein one or more C-atoms may be replaced by N, O or S. Unsaturated means that the cycloalkenyl contains at least one C=C double bond. Examples of $C_3$-$C_6$ (hetero)cycloalkenyl are cyclopropen, cycolbuten, cyclopenten, and cyclohexen.

The term "$C_2$-$C_6$ alkynyl" as used herein refers to an unsaturated straight or branched hydrocarbon group with 2 to 6 carbon atoms having one free valence, wherein the hydrocarbon group contains at least one C—C triple bond. $C_2$-$C_{10}$ alkynyl includes for example ethynyl, 1-propynyl, 2-propynyl, 1-n-butinyl, 2-n-butynyl, iso-butinyl, 1-pentynyl, 1-hexynyl and the like. Preferred is $C_2$-$C_4$ alkynyl, in particular propynyl. The preferred propenyl is 1-propyn-3-yl also called propargyl.

The term "$C_5$-$C_7$ (hetero)aryl" as used herein denotes an aromatic 5- to 7-membered hydrocarbon cycle having one free valence, wherein one or more C-atom may be replaced by N, O or S. An example of $C_5$-$C_7$ aryl is phenyl, examples of $C_5$-$C_7$ heteroaryl are pyrrolyl, furanyl, thiophenyl, pyridinyl, pyranyl, and thiopyranyl.

The term "$C_7$-$C_{13}$ aralkyl" as used herein denotes an aromatic 5- to 7-membered hydrocarbon cycle substituted by one or more $C_1$-$C_6$ alkyl. The $C_7$-$C_{13}$ aralkyl group contains in total 7 to 13 C-atoms and has one free valence. The free valence may be located in the aromatic cycle or in a $C_1$-$C_6$ alkyl group, i.e. $C_7$-$C_{13}$ aralkyl group may be bound via the aromatic part or via the alkyl part of the group. Examples of $C_7$-$C_{13}$ aralkyl are methylphenyl, 1,2-dimethylphenyl, 1,3-dimethylphenyl, 1,4-dimethylphenyl, ethylphenyl, 2-propylphenyl, and the like.

The term "$A^1$ and $A^2$ are combined and form together with $X^1$ and $X^2$ and the C=C double bond a 5- to 7-membered unsaturated or aromatic heterocycle" is intended to mean that the 5- to 7-membered unsaturated or aromatic hydrocarbon cycle or heterocycle is formed by $A^1$, $A^2$ together with the double bond of general formula (I), i.e. the two C-atoms of the double bond are 2 members of the 5- to 7-membered unsaturated or aromatic heterocycle. The term "unsaturated or aromatic heterocycle" means an unsaturated or aromatic hydrocarbon cycle wherein at least two C-atoms of the cycle are substituted by N, O, P or S.

According to one embodiment of the present invention the at least one compound of formula (I) is selected from compounds of formula (I)
wherein
$X^1$ and $X^2$ are independently from each other selected from $N(R^1)$ and $N=C(R^2)$;
$R^1$ is selected from H, $C_1$-$C_6$ alkyl, $C_2$-$C_6$ alkenyl, $C_5$-$C_7$ (hetero)aryl, and $C_7$-$C_{13}$ aralkyl, wherein alkyl, alkenyl (hetero)aryl, and aralkyl may be substituted by one or more substituents selected from F, CN, $C_1$-$C_6$ alkyl, $OR^{3a}$, $C(O)R^{3a}$, $C(O)OR^{3a}$, $S(O)_2OR^{3a}$, and $OS(O)_2R^{3a}$;
$R^2$ is selected from H, $C_1$-$C_6$ alkyl, $C_2$-$C_6$ alkenyl, $C_5$-$C_7$ (hetero)aryl, $C_7$-$C_{13}$ aralkyl, and $NR^3R^4$, wherein alkyl, alkenyl (hetero)aryl, and aralkyl may be substituted by one or more substituents selected from F, CN, $C_1$-$C_6$ alkyl, $OR^{3a}$, $C(O)R^{3a}$, $C(O)OR^{3a}$, $S(O)_2OR^{3a}$, and $OS(O)_2R^{3a}$;
$R^3$, $R^4$, and $R^{3a}$ is selected from H, $C_1$-$C_6$ alkyl, and $C_2$-$C_6$ alkenyl, wherein alkyl and alkenyl may be substituted by one or more substituents selected from F and CN;
$A^1$ is selected from $C_1$-$C_6$ alkyl, $C_2$-$C_6$ alkenyl, $C_5$-$C_7$ (hetero)aryl, and $C_7$-$C_{13}$ aralkyl, wherein alkyl, alkenyl, (hetero)aryl, and aralkyl may be substituted by one or more substituents selected from F, CN, $C_1$-$C_6$ alkyl, $C_2$-$C_6$ alkenyl, $OS(O)_2R^{6a}$ and $OR^{6a}$;

$A^2$ is selected from H, $C_1$-$C_6$ alkyl, $C_2$-$C_6$ alkenyl, $C_5$-$C_7$ (hetero)aryl, and $C_7$-$C_{13}$ aralkyl, wherein alkyl, alkenyl, (hetero)aryl, and aralkyl may be substituted by one or more substituents selected from F, CN, $C_1$-$C_6$ alkyl, $C_2$-$C_6$ alkenyl, $OS(O)_2R^{6a}$ and $OR^{6a}$, $R^{6a}$ is selected from H, $C_1$-$C_6$ alkyl, and $C_2$-$C_6$ alkenyl, wherein alkyl and alkenyl may be substituted by one or more substituents selected from F, CN, and $OR^{6c}$;

$R^{6c}$ is selected from H, $C_1$-$C_6$ alkyl, and $C_2$-$C_6$ alkenyl wherein alkyl and alkenyl may be substituted by one or more substituents selected from F and CN.

In the context of the present invention, $N=C(R^2)$ and $N=C(R^2)$— are being used interchangeably, and they each refer to the following structural unit:

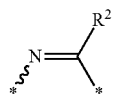

In one embodiment of the present invention, both $X^1$ and $X^2$ are independently from each other selected from $N(R^1)$, $P(R^1)$, O, and S.

In one embodiment of the present invention, $X^1$ and $X^2$ are independently from each other selected from $N(R^1)$, $N=C(R^2)$ and O.

According to a preferred embodiment of the present invention the at least one compound of formula (I) is selected from compounds of formula (I) wherein $X^1$ and $X^2$ are selected independently from each other from $N(R^1)$ and $N=C(R^2)$—, and $A^1$ and $A^2$ are independently from each other selected from $C_1$-$C_6$ alkyl, $C_3$-$C_6$ (hetero)cycloalkyl, $C_2$-$C_6$ alkenyl, $C_3$-$C_6$ (heterero)cycloalkenyl, $C_2$-$C_6$ alkynyl, $C_5$-$C_7$ (hetero)aryl, $C_7$-$C_{13}$ aralkyl, $OR^6$, $C(O)R^6$, $C(NR^6)R^7$ and $C(O)OR^6$, wherein alkyl, (hetero)cycloalkyl, alkenyl, (hetero)cycloalkenyl, alkynyl, (hetero)aryl, and aralkyl may be substituted by one or more substituents selected from F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{6a}$, $OS(O)_2R^{6a}$, $S(O)_2$ $R^{6a}$, $OR^{6a}$, $C(O)OR^{6a}$, $NR^{6a}R^{6b}$, and $NC(O)R^{6a}R^{6b}$; and the further substituents are defined as above.

Within this embodiment it is preferred if $R^1$ and $R^2$ are selected independently from each other from H, $C_1$-$C_6$ alkyl, $C_2$-$C_6$ alkenyl, $C_5$-$C_7$ (hetero)aryl, and $C_7$-$C_{13}$ aralkyl, wherein alkyl, alkenyl (hetero)aryl, and aralkyl may be substituted by one or more substituents selected from F, CN, $C_1$-$C_6$ alkyl, and $OR^{3a}$;

$R^{3a}$ is selected from H, $C_1$-$C_6$ alkyl, and $C_2$-$C_6$ alkenyl, wherein alkyl and alkenyl may be substituted by one or more substituents selected from F and CN;

$A^1$ and $A^2$ are selected independently from each other from $C_1$-$C_6$ alkyl, $C_2$-$C_6$ alkenyl, $C_5$-$C_7$ (hetero)aryl, and $C_7$-$C_{13}$ aralkyl, wherein alkyl, alkenyl, (hetero)aryl, and aralkyl may be substituted by one or more substituents selected from F, CN, $C_1$-$C_6$ alkyl, and $OR^{6a}$;

$R^{6a}$ is selected from H, $C_1$-$C_6$ alkyl, wherein alkyl may be substituted by one or more substituents selected from F and CN.

Within this embodiment $R^1$ is preferably H.

Within this embodiment it is further preferred if $X^1$ is NH, and $X^2$ is $N(R^1)$ or $N=C(R^2)$.

In one embodiment of the present invention, $X^1$ is selected from $N(R^1)$, $P(R^1)$, oxygen and sulfur, and $X^2$ is $N=C(R^2)$.

Even more preferably, compound of formula (I) is selected from compounds of formula (I a) wherein $X^1$ is $N(R^1)$ and $X^2$ is $N=C(R^2)$,

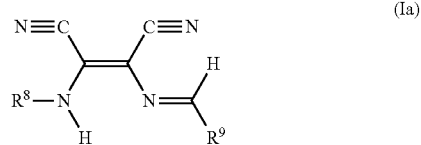

wherein $R^9$ is selected from H, $C_5$-$C_7$ (hetero)aryl and $C_7$-$C_{13}$ aralkyl, and $R^9$ is selected from $C_5$-$C_7$ (hetero)aryl and $C_7$-$C_{13}$ aralkyl, wherein $C_5$-$C_7$ (hetero)aryl and $C_7$-$C_{13}$ aralkyl may be substituted by one or more substituents selected from F, CN, $C_1$-$C_6$ alkyl, and $OR^{6a}$.

In one embodiment of the present invention the at least one compound of formula (I) is selected from compounds of formula (I b) wherein $X^1$ and $X^2$ are $N(R^1)$

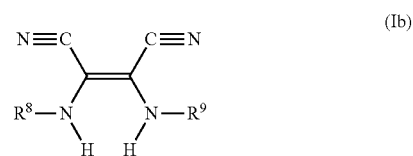

wherein $R^8$ is selected from H, $C_5$-$C_7$ (hetero)aryl and $C_7$-$C_{13}$ aralkyl, and $R^9$ is selected from $C_5$-$C_7$ (hetero)aryl and $C_7$-$C_{13}$ aralkyl, wherein $C_5$-$C_7$ (hetero)aryl and $C_7$-$C_{13}$ aralkyl may be substituted by one or more substituents selected from F, CN, $C_1$-$C_6$ alkyl, and $OR^{6a}$.

In formulae (I a) and (I b) as well as in formula (I), specific examples of $C_5$-$C_7$ (hetero)aryl are phenyl, 2-pyridyl, 3-pyridyl, 4.pyridyl. Specific examples of $C_7$-$C_{13}$ aralkyl are benzyl, 2-phenylethyl, and 1-phenylethyl. Specific examples of substituted $C_5$-$C_7$ (hetero)aryl are 2-methylphenyl, para-tolyl, para-methoxyphenyl, para-cyanophenyl, 4-fluorophenyl, 2,4-difluorophenyl, and 3,5-dimethylphenyl.

The concentration of the at least one compound of formula (I) in the inventive electrolyte composition (A) usually is 0.001 to 10 wt.-%, preferred 0.01 to 2 wt.-%, more preferred 0.01 to <1 wt.-%, most preferred 0.01 to 0.9 wt.-%, and in particular 0.01 to 0.75 wt.-% based on the total weight of the electrolyte composition (A).

The electrolyte composition (A) may contain at least one further additive (iv) which is selected from the group consisting of vinylene carbonate and its derivatives, vinyl ethylene carbonate and its derivatives, methyl ethylene carbonate and its derivatives, lithium (bisoxalato) borate, lithium difluoro (oxalato) borate, lithium tetrafluoro (oxalato) phosphate, lithium oxalate, 2-vinyl pyridine, 4-vinyl pyridine, cyclic exo-methylene carbonates, sultones, cyclic and acyclic sulfonates, cyclic and acyclic sulfites, cyclic and acyclic sulfinates, organic esters of inorganic acids, acyclic and cyclic alkanes having a boiling point at 1 bar of at least 36° C., and aromatic compounds, optionally halogenated cyclic and acyclic sulfonylimides, optionally halogenated cyclic and acyclic phosphate esters, optionally halogenated cyclic and acyclic phosphines, optionally halogenated cyclic and acyclic phosphites including, optionally halogenated cyclic and acyclic phosphazenes, optionally halogenated cyclic and acyclic silylamines, optionally halogenated cyclic and acyclic halogenated esters, optionally halogenated cyclic and acyclic amides, optionally halogenated cyclic and acyclic anhydrides, ionic liquids, and optionally halogenated organic heterocycles. The additive (iv) is preferably selected to be different from the compound selected as conducting salt (ii) present in the respective electrolyte composition (A). Preferably additive (iv) is also different from the at least one organic aprotic solvent (i) present in the respective electrolyte composition (A).

Preferred ionic liquids according to the present invention are selected from ionic liquids of formula [K][L] in which:
[K] denotes a cation, preferably reduction-stable, selected from the cation groups of the general formulae (II) to (IX)

 (II)

 (III)

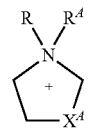 (IV)

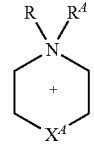 (V)

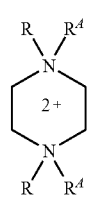 (VI)

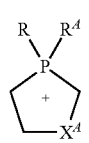 (VII)

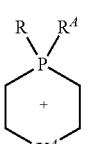 (VIII)

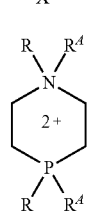 (IX)

wherein
R denotes H, $C_1$- to $C_6$-alkyl, $C_2$- to $C_6$-alkenyl, and phenyl, preferably methyl, ethyl, and propyl;

$R^A$ denotes —$(CH_2)_s$—O—C(O)—R, —$(CH_2)_s$—C(O)—OR, —$(CH_2)_s$—S(O)_2—OR, —$(CH_2)_s$—O—S(O)_2—R, —$(CH_2)_s$—O—S(O)_2—OR, —$(CH_2)_s$—O—C(O)—OR, —$(CH_2)_s$—HC=CH—R, —$(CH_2)_s$—CN,

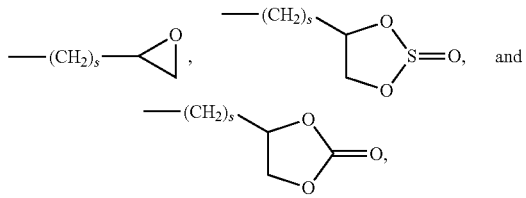

wherein individual $CH_2$ groups may be replaced by O, S or NR and s=1 to 8, preferably s=1 to 3;
$X^A$ denotes $CH_2$, O, S or $NR^B$;
$R^B$ denotes H, $C_1$- to $C_6$-alkyl, $C_2$- to $C_6$-alkenyl, phenyl, and —$(CH_2)_s$—CN with s=1 to 8, preferably s=1 to 3; preferably $R^B$ is methyl, ethyl, propyl or H;
and
[L] denotes an anion selected from the group $BF_4^-$, $PF_6^-$, $[B(C_2O_4)_2]^-$, $[F_2B(C_2O_4)]^-$, $[N(S(O)_2F)_2]^-$, $[F_pP(C_qF_{2q+1})_{6-p}]^-$, $[N(S(O)_2C_qF_{2q+1})_2]$, $[(C_qF_{2q+1})_2P(O)O]^-$, $[C_qF_{2q+1}P(O)O_2]^{2-}$, $[OC(O)C_qF_{2q+1}]^-$, $[OS(O)_2C_qF_{2q+1}]^-$; $[N(C(O)C_qF_{2q+1})_2]^-$; $[N(C(O)C_qF_{2q+1})(S(O)_2C_qF_{2q+1})]^-$; $[N(C(O)C_qF_{2q+1})(C(O))F]^-$; $[N(S(O)_2C_qF_{2q+1})(S(O)_2F)]^-$; $[C(C(O)C_qF_{2q+1})_3]^-$, and $[C(S(O)_2C_qF_{2q+1})_3N(SO_2CF_3)_2]^-$, wherein p is an integer in the range from 0 to 6 and q is an integer in the range from 1 to 20, preferably q is an integer in the ranger from 1 to 4.

Preferred ionic liquids for use as additive (iv) are ionic liquids of formula [K][L] in which [K] is selected from pyrrolidinium cations of formula (II) with X is $CH_2$ and s is an integer in the range of from 1 to 3 and [L] is selected from the group consisting of $BF_4^-$, $PF_6^-$, $[B(C_2O_4)_2]^-$, $[F_2B(C_2O_4)]^-$, $[N(S(O)_2F)_2]^-$, $[N(SO_2C_2F_5)_2^2]^-$, $[F_3P(C_2F_5)_3]^-$, and $[F_3P(C_4F_9)_3]^-$.

If one or more further additives (iv) are present in the electrolyte composition (A), the total concentration of further additives (iv) is at least 0.001 wt.-%, preferred 0.005 to 5 wt.-% and most preferred 0.01 to 2 wt.-%, based on the total weight of the electrolyte composition (A).

A further object of the present invention is the use of at least one compound of formula (I) as defined above as additive for electrolytes in electrochemical cells, preferably in lithium ion secondary electrochemical cells.

The compounds of general formula (I) are well-suited as film forming additives in electrochemical cells. The film may be formed on the anode and/or on the cathode. Preferably the compounds of general formula (I) are used as film forming additives in lithium ion secondary electrochemical cells, in particular as additives forming a film on the cathode of lithium ion secondary electrochemical cells.

The compounds of general formula (I) are usually added to the electrolyte composition to yield a concentration of from is 0.001 to 10 wt.-%, preferred 0.01 to 2 wt.-%, more preferred 0.01 to <1 wt.-%, most preferred 0.01 to 0.9 wt.-%, and in particular 0.01 to 0.75 wt.-%, based on the total weight of the electrolyte composition (A).

Another object of the present invention is an electrochemical cell comprising
(A) the electrolyte composition as described above,
(B) at least one cathode comprising at least one cathode active material, and (C) at least one anode comprising at least one anode active material.

Preferably the electrochemical cell is a secondary lithium ion electrochemical cell, i.e. secondary lithium ion electrochemical cell comprising a cathode comprising a cathode active material that can reversibly occlude and release lithium ions and an anode comprising a anode active material that can reversibly occlude and release lithium ions. The terms "secondary lithium ion electrochemical cell" and "(secondary) lithium ion battery" are used interchangeably within the present invention.

The at least one cathode active material preferably comprises a material capable of occluding and releasing lithium ions selected from lithiated transition metal phosphates and lithium ion intercalating transition metal oxides.

Examples of lithiated transition metal phosphates are $LiFePO_4$ and $LiCoPO_4$, examples of lithium ion intercalating transition metal oxides are transition metal oxides with layer structure having the general formula (X) $Li_{(1+z)}[Ni_a Co_b Mn_c]_{(1-z)}O_{2+e}$ wherein z is 0 to 0.3; a, b and c may be same or different and are independently 0 to 0.8 wherein a+b+c=1; and $-0.1 \le e \le 0.1$, and manganese-containing spinels of general formula (XI) $Li_{1+t}M_{2-t}O_{4-d}$ wherein d is 0 to 0.4, t is 0 to 0.4 and M is Mn and at least one further metal selected from the group consisting of Co and Ni, and $Li_{(1+g)}[Ni_h Co_i Al_j]_{(1-g)}O_{2+k}$. Typical values for g, h, l, j and k are: g=0, h=0.8 to 0.85, i=0.15 to 0.20, j=0.02 to 0.03 and k=0.

In one preferred embodiment the cathode active material is selected from $LiCoPO_4$. The cathode containing $LiCoPO_4$ as cathode active material may also be referred to as $LiCoPO_4$ cathode. The $LiCoPO_4$ may be doped with Fe, Mn, Ni, V, Mg, Al, Zr, Nb, Tl, Ti, K, Na, Ca, Si, Sn, Ge, Ga, B, As, Cr, Sr, or rare earth elements, i.e., a lanthanide, scandium and yttrium. $LiCoPO_4$ with olivine structure is particularly suited according the present invention due to its high operating voltage (red-ox potential of 4.8 V vs. $Li/Li^+$), flat voltage profile and a high theoretical capacity of about 170 mAh/g. The cathode may comprise a $LiCoPO_4/C$ composite material. The preparation of a suited cathode comprising a $LiCoPO_4/C$ composite material is described in Scharabi et al., 2011 and Markevich et al., 2012.

In another preferred embodiment of the present invention the cathode active material is selected from transition metal oxides with layer structure having the general formula (X) $Li_{(1+z)}[Ni_a Co_b Mn_c]_{(1-z)}O_{2+e}$ wherein z is 0 to 0.3; a, b and c may be same or different and are independently 0 to 0.8 wherein a+b+c=1; and $-0.1 \le e \le 0.1$. Preferred are transition metal oxides with layer structure having the general formula (X) $Li_{(1+z)}[Ni_a Co_b Mn_c]_{(1-z)}O_{2+e}$ wherein z is 0.05 to 0.3, a=0.2 to 0.5, b=0 to 0.3 and c=0.4 to 0.8 wherein a+b+c=1; and $-0.1 \le e \le 0.1$. In one embodiment of the present invention, the transition metal oxides with layer structure of general formula (X) are selected from those in which $[Ni_a Co_b Mn_c]$ is selected from $Ni_{0.33}Co_0Mn_{0.66}$, $Ni_{0.25}Co_0Mn_{0.75}$, $Ni_{0.35}Co_{0.15}Mn_{0.5}$, $Ni_{0.21}Co_{0.08}Mn_{0.71}$ and $Ni_{0.22}Co_{0.12}Mn_{0.66}$, in particular preferred are $Ni_{0.21}Co_{0.08}Mn_{0.71}$ and $Ni_{0.22}Co_{0.12}Mn_{0.66}$. The transition metal oxides of general formula (X) are also called High Energy NCM (HE-NCM) since they have higher energy densities than usual NCMs. Both HE-NCM and NCM have operating voltage of about 3.3 to 3.8 V against $Li/Li^+$, but high cut off voltages (>4.6 V) have to be used for charging HE-NCMS to actually accomplish full charging and to benefit from their higher energy density.

According to a further preferred embodiment of the present invention the cathode active material is selected from manganese-containing spinels of general formula (XI) $Li_{1+t}M_{2-t}O_{4-d}$ wherein d is 0 to 0.4, t is 0 to 0.4 and M is Mn and at least one further metal selected from the group consisting of Co and Ni. An example of a suited manganese-containing spinel of general formula (XI) is $LiNi_{0.5}Mn_{1.5}O_{4-d}$. These spinels are also called HV (high voltage)-spinels.

Many elements are ubiquitous. For example, sodium, potassium and chloride are detectable in certain very small proportions in virtually all inorganic materials. In the context of the present invention, proportions of less than 0.5% by weight of cations or anions are disregarded, i.e. amounts of cations or anions below 0.5% by weight are regarded as non-significant. Any lithium ion-containing transition metal oxide comprising less than 0.5% by weight of sodium is thus considered to be sodium-free in the context of the present invention. Correspondingly, any lithium ion-containing mixed transition metal oxide comprising less than 0.5% by weight of sulfate ions is considered to be sulfate-free in the context of the present invention.

The cathode may further comprise electrically conductive materials like electrically conductive carbon and usual components like binders. Compounds suited as electrically conductive materials and binders are known to the person skilled in the art. For example, the cathode may comprise carbon in a conductive polymorph, for example selected from graphite, carbon black, carbon nanotubes, carbon nanofibers, graphene or mixtures of at least two of the aforementioned substances. In addition, the cathode may comprise one or more binders, for example one or more organic polymers like polyethylene, polyacrylonitrile, polybutadiene, polypropylene, polystyrene, polyacrylates, polyvinyl alcohol, polyisoprene and copolymers of at least two comonomers selected from ethylene, propylene, styrene, (meth)acrylonitrile and 1,3-butadiene, especially styrene-butadiene copolymers, and halogenated (co)polymers like polyvinlyidene chloride, polyvinly chloride, polyvinyl fluoride, polyvinylidene fluoride (PVdF), polytetrafluoroethylene, copolymers of tetrafluoroethylene and hexafluoropropylene, copolymers of tetrafluoroethylene and vinylidene fluoride and polyacrylnitrile.

Furthermore, the cathode may comprise a current collector which may be a metal wire, a metal grid, a metal web, a metal sheet, a metal foil or a metal plate. A suited metal foil is aluminum foil.

According to one embodiment of the present invention the cathode has a thickness of from 25 to 200 μm, preferably of from 30 to 100 μm, based on the whole thickness of the cathode without the thickness of the current collector.

The anode (C) comprised within the lithium ion secondary battery of the present invention comprises an anode active material that can reversibly occlude and release lithium ions. In particular carbonaceous material that can reversibly occlude and release lithium ions can be used as anode active material. Carbonaceous materials suited are crystalline carbon such as a graphite material, more particularly, natural graphite, graphitized cokes, graphitized MCMB, and graphitized MPCF; amorphous carbon such as coke, mesocarbon microbeads (MCMB) fired below 1500° C., and mesophase pitch-based carbon fiber (MPCF); hard carbon and carbonic anode active material (thermally decomposed carbon, coke, graphite) such as a carbon composite, combusted organic polymer, and carbon fiber.

Further anode active materials are lithium metal, or materials containing an element capable of forming an alloy with lithium. Non-limiting examples of materials containing an element capable of forming an alloy with lithium include a metal, a semimetal, or an alloy thereof. It should be understood that the term "alloy" as used herein refers to both alloys of two or more metals as well as alloys of one or more metals together with one or more semimetals. If an alloy has metallic properties as a whole, the alloy may contain a nonmetal element. In the texture of the alloy, a solid solution, a eutectic (eutectic mixture), an intermetallic compound or two or more thereof coexist. Examples of such metal or semimetal elements include, without being limited to, titanium (Ti), tin (Sn), lead (Pb), aluminum, indium (In), zinc (Zn), antimony (Sb), bismuth (Bi), gallium (Ga), germanium (Ge), arsenic (As), silver (Ag), hafnium (Hf), zirconium (Zr) yttrium (Y), and silicon (Si). Metal and semimetal elements of Group 4 or 14 in the long-form periodic table of the elements are preferable, and especially preferable are titanium, silicon and tin, in particular silicon. Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr). Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

A further possible anode active material is silicon which is able to take up lithium ions. The silicon may be used in different forms, e.g. in the form of nanowires, nanotubes, nanoparticles, films, nanoporous silicon or silicon nanotubes. The silicon may be deposited on a current collector. The current collector may be a metal wire, a metal grid, a metal web, a metal sheet, a metal foil or a metal plate. Preferred the current collector is a metal foil, e.g. a copper foil. Thin films of silicon may be deposited on metal foils by any technique known to the person skilled in the art, e.g. by sputtering techniques. One possibility of preparing Si thin film electrodes are described in R. Elazari et al.; Electrochem. Comm. 2012, 14, 21-24. It is also possible to use a silicon/carbon composite as anode active material according to the present invention.

Another possible anode active material are lithium ion intercalating oxides of Ti.

Preferably the anode active material present in the inventive lithium ion secondary battery is selected from carbonaceous material that can reversibly occlude and release lithium ions, particularly preferred the carbonaceous material that can reversibly occlude and release lithium ions is selected from crystalline carbon, hard carbon and amorphous carbon, in particular preferred is graphite. In another preferred embodiment the anode active material present in the inventive lithium ion secondary battery is selected from silicon that can reversibly occlude and release lithium ions, preferably the anode comprises a thin film of silicon or a silicon/carbon composite. In a further preferred embodiment the anode active material present in the inventive lithium ion secondary battery is selected from lithium ion intercalating oxides of Ti.

The anode and cathode may be made by preparing an electrode slurry composition by dispersing the electrode active material, a binder, optionally a conductive material and a thickener, if desired, in a solvent and coating the slurry composition onto a current collector. The current collector may be a metal wire, a metal grid, a metal web, a metal sheet, a metal foil or a metal plate. Preferred the current collector is a metal foil, e.g. a copper foil or aluminum foil.

The inventive lithium ion batteries may contain further constituents customary per se, for example separators, housings, cable connections etc. The housing may be of any shape, for example cuboidal or in the shape of a cylinder, the shape of a prism or the housing used is a metal-plastic composite film processed as a pouch. Suited separators are for example glass fiber separators and polymer-based separators like polyolefin separators.

Several inventive lithium ion batteries may be combined with one another, for example in series connection or in parallel connection. Series connection is preferred. The present invention further provides for the use of inventive lithium ion batteries as described above in devices, especially in mobile devices. Examples of mobile devices are vehicles, for example automobiles, bicycles, aircraft, or water vehicles such as boats or ships. Other examples of mobile devices are those which are portable, for example computers, especially laptops, telephones or electrical power tools, for example from the construction sector, especially drills, battery-driven screwdrivers or battery-driven staplers. But the inventive lithium ion batteries can also be used for stationary energy stores.

The invention is illustrated by the examples which follow, which do not, however, restrict the invention.

1. PREPARATION OF COMPOUNDS

Compound 1:
2-amino-3-(benzylideneamino)but-2-enedinitrile

To 1 L four necked bottle 54.05 g (0.50 mol) diaminomaleonitrile and 500 ml methanol were added under nitrogen atmosphere. The mixture was heated up to reflux temperature and 53.07 g (0.50 mol) benzaldehyde was added dropwise within 30 minutes. The mixture was stirred at reflux temperature for 24 hours. After cooling down to 10° C. the precipitated solid was filtered off and slurried in 200 ml of n-hexane. After stirring the suspension for 5 hours at room temperature, the brown solid was filtered off giving 70 g (Yield: 71.35%) 2-amino-3-(benzylideneamino)but-2-enedinitrile after drying 12 hours at 40° C.

Compound 2: 2-amino-3-(p-tolylmethyleneamino)
but-2-enedinitrile

To 250 ml four necked bottle 5.41 g (0.050 mol) diaminomaleonitrile, 50 ml tetrahydrofuran and catalytic amount of sulfuric acid were added under nitrogen atmosphere. The mixture was heated up to reflux temperature and 6.01 g (0.050 mol) 4-methylbenzaldehyde was added dropwise within 10 minutes. The mixture was stirred at reflux temperature for 10 hours. Following the evaporation of the solvent the yellow residual was twice slurried and washed in 200 ml n-hexane, giving by filtration 9.94 g (Yield: 94.55%) 2-amino-3-(p-tolylmethyleneamino)but-2-enedinitrile after drying 6 hours at 40° C.

Compound 3: 2-amino-3-(2-pyridilmethylenamino)
but-2-enedinitrile

To 250 ml four necked bottle 5.41 g (0.050 mol) diaminomaleonitrile and 50 ml methanol were added under nitrogen atmosphere. At room temperature 5.36 g (0.050 mol) pyridine-2-carbaldehyde was added drop-wise within 5 minutes. After stirring at room temperature for 15 minutes the mixture was cooled down to 0° C. and the precipitated solid was filtered off. The solid was suspended in 100 ml of 1:1 mixture of n-hexane and methyl-tertbutylether. After stirring the suspension for 1 hour at room temperature, the light yellow solid was filtered off giving 7.33 g (Yield: 74.33%) 2-amino-3-(2-pyridilmethylenamino)but-2-enedinitrile after drying 6 hours at 40° C.

Compound 4:
2-amino-3-(benzylamino)but-2-enedinitrile

To 500 ml four necked bottle 10.0 g (0.051 mol) 2-amino-3-(benzylideneamino)but-2-enedinitrile, 100 ml methanol and 150 ml tetrahydrofuran were added under nitrogen atmosphere. At room temperature 1.93 g (0.051 mol) sodium borohydride was added portion-wise within 10 minutes. After stirring at room temperature for 15 minutes the mixture was poured on 1 L ice-water and the precipitated solid was filtered off and washed with water. The filtered material was slurried in 200 ml of n-hexane and after 2 hours stirring at room temperature, the light brown solid was filtered off giving 8.01 g (Yield: 80.90%) 2-amino-3-(benzylamino)but-2-enedinitrile after drying 6 hours at 40° C.

Compound 5:
2-amino-3-(p-tolylmethylamino)but-2-enedinitrile

To 500 ml four necked bottle 10.56 g (0.050 mol) 2-amino-3-(p-tolylmethyleneamino)but-2-enedinitrile, 100 ml methanol and 150 ml tetrahydrofurane were added under nitrogen atmosphere. At room temperature 1.89 g (0.050 mol) sodium borohydride was added portion-wise within 10 minutes. After stirring at room temperature for 15 minutes the mixture was poured on 1 L ice-water and the precipitated solid was filtered off and washed with water. The filtered material was slurried in 400 ml of n-hexane and after 4 hours stirring at room temperature, the light brown solid was filtered off giving 9.87 g (Yield: 93.00%) 2-amino-3-(p-tolylmethylamino)but-2-enedinitrile after drying 6 hours at 40° C.

Compound 6: 2-(benzylamino)-3-(benzylideneamino)but-2-enedinitrile

To 250 ml four necked bottle 4.96 g (0.025 mol) 2-amino-3-(benzylamino)but-2-enedinitrile, 50 ml methanol and catalytic amount of sulfuric acid were added under nitrogen atmosphere. The mixture was heated up to reflux temperature and 2.65 g (0.025 mol) benzaldehyde was added dropwise within 5 minutes. The mixture was stirred at reflux temperature for 24 hours. After cooling down to 0° C. the precipitated solid was filtered off and slurried in 200 ml of n-hexane. After stirring the suspension for 5 hours at room temperature, the light green solid was filtered off giving 6.46 g (Yield: 90.25%) 2-(benzylamino)-3-(benzylideneamino)but-2-enedinitrile after drying 12 hours at 40° C.

Compound 7:
2,3-bis(benzylamino)but-2-enedinitrile

To 500 ml four necked bottle 14.63 g (0.051 mol) 2-(benzylamino)-3-(benzylideneamino)but-2-enedinitrile, 100 ml methanol and 150 ml tetrahydrofurane were added under nitrogen atmosphere. At room temperature 1.93 g (0.051 mol) sodium borohydride was added portion-wise within 10 minutes. After stirring at room temperature for 15 minutes the mixture was poured on 1 L ice-water and the precipitated solid was filtered off and washed with water. The filtered material was slurried in 400 ml of n-hexane and after 5 hours stirring at room temperature, the light brown solid was filtered off giving 12.22 g (Yield: 83.10%) 2,3-bis(benzylamino)but-2-enedinitrile after drying 6 hours at 40° C.

Compound 8: Diaminomaleonitrile

Purchased from Aldrich

Compounds 1 to 9 are summarized in Table 1.

TABLE 1

| Compound | Name | Structure |
| --- | --- | --- |
| 1 | 2-amino-3-(benzylideneamino)but-2-enedinitrile | |
| 2 | 2-amino-3-(p-tolylmethyleneamino)but-2-enedinitrile | |
| 3 | 2-amino-3-(2-pyridilmethylenamino)but-2-enedinitrile | |

TABLE 1-continued

| Compound | Name | Structure |
|---|---|---|
| 4 | 2-amino-3-(benzylamino)but-2-enedinitrile | *(structure)* |
| 5 | 2-amino-3-(p-tolylmethylamino)but-2-enedinitrile | *(structure)* |
| 6 | 2-(benzylamino)-3-(benzylideneamino)but-2-enedinitrile | *(structure)* |
| 7 | 2,3-bis(benzylamino)but-2-enedinitrile | *(structure)* |
| 8 | Diaminomaleonitrile | *(structure)* |

2. ELECTROCHEMICAL CELLS

Pouch type cells were used to prepare the electrochemical cells. A high voltage spinel (LiNi$_{0.5}$Mn$_{1.5}$O$_4$, BASF SE) was used as cathode active material. A slurry composed of carbon black, graphite, binder and HV-spinel in N-ethyl-2-pyrrolidon (NEP) was prepared in a centrifuge. The slurry was spread onto an aluminum foil and the foil was then dried and cut to dimensions. The electrodes were inserted in a glove box under Argon atmosphere and dried at 120° C. in a vacuum oven. The anode was a graphite anode (Enertek, South Korea, Germany), and a glass fiber separator was used (Whatman GF/A).

The basic electrolyte composition (LP57) contained a mixture of ethylene carbonate and ethyl-methyl carbonate (3:7 by weight) as solvent and 12.7 wt.-% of lithium hexafluorophosphate as conducting salt. The respective additive was solved in the basic electrolyte composition. The amount of electrolyte composition used per cell was 105 µl.

The electrochemical testing was done in a Maccor potentiostat Serie 4000 at 25° C. Cycling measurements were carried out up to an upper voltage of 4.8 V and to a lower voltage of 3.3 V. The first cycle was done at a rate of C/10. A current of 1C was defined as 148 mA/g. A cycle is comprised of one charge and one discharge step. The charge was carried out in constant current constant voltage mode (CCCV). In this mode, a constant current is passed through the electrochemical cell until a cell voltage of 4.8 V was reached. The voltage is then held constant at 4.8 V until the residual current falls to one tenth of its original value or if 30 min have elapsed. The discharge is performed in constant current mode. A constant current was applied to the electrochemical cell until a cell potential of 3.3 V was reached. The cycling program used is shown in Table 2. The steps listed under "Cycling" were repeated several times, i.e. after finishing the 50 cycles at 1C, the cycling program was repeated starting with 3 cycles at 1 C, followed by 3 cycles at 2 C etc. The results of the cycling experiments are shown in Table 3.

TABLE 2

| | Cycling program | | | | | | |
|---|---|---|---|---|---|---|---|
| | Formation | | | Cycling | | | |
| | Rest | 0.1 C (14.8 mA/g) | 0.5 C (74 mA/g) | 1 C (148 mA/g) | 2 C (296 mA/g) | 4 C (592 mA/g) | 10 C (1480 mA/g) | 1 C (148 mA/g) |
| time Number of cycles | 2 h | 2 | 10 | 3 | 3 | 3 | 3 | 50 |
| | Performed once | | | Performed multiple times | | | | |

TABLE 3

Discharge capacity at 1 C

| | | 1 C discharge capacity [%] | | | |
|---|---|---|---|---|---|
| | Cycle # | 13 | 50 | 100 | 300 |
| Comparative example 1 | LP57 | 100.0 | 87.2 | 75.2 | 20.5 |
| Comparative example 2 | LP57 + 0.1 wt.-% Acrylonitrile | 97.4 | 88.9 | 77.8 | 22.2 |
| Comparative example 3 | LP57 + 0.5 wt.-% Acrylonitrile | 105 | 97.4 | 83 | 22.7 |
| Comparative example 4 | LP57 + 2 wt.-% Acrylonitrile | 90 | 72.7 | 50 | 5.5 |
| Comparative example 1 | LP57 + 0.5 wt.-% cpd 8 | 98.7 | 91.3 | 82.9 | 64.4 |
| Inventive example 2 | LP57 + 0.1 wt.-% cpd 4 | 99.1 | 93.2 | 87.2 | 71.8 |

The discharge capacity of the 13th cycle of the comparative example 1 (LP 57, the basis electrolyte solution without any additive) was taken as basis value for all discharge capacities displayed in Table 3. It can be seen that a small amount of acrylonitrile has a beneficial effect on the discharge capacity, but that this effect is very small after 300 cycles. The addition of diaminomaleonitrile (compound 8), 2-amino-3-(benzylamino)but-2-enedinitrile (compound 4) or 1,4,5,6-Tetrahydro-5,6-dioxo-2,3-pyrazinedicarbonitrile (compound 9) according to the invention results in a pronounced increase of the discharge capacity even after 300 cycles in comparison to the electrolyte composition containing the same amount of acrylonitrile.

The invention claimed is:
1. An electrolyte composition (A) comprising:
(i) an aprotic organic solvent;
(ii) a conducting salt;
(iii) a compound of formula (I)

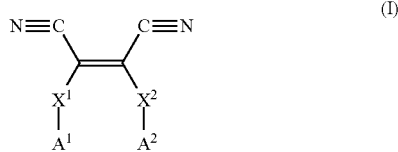

wherein
$X^1$ and $X^2$ are independently from each other selected from the group consisting of $N(R^1)$, $N=C(R^2)$—, and $P(R^1)$;
$R^1$ is selected from the group consisting of H, $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, $C_7$-$C_3$ aralkyl, $OR^3$, $C(O)R^3$, $C(NR^3)$ $R^4$, and $C(O)OR^3$, wherein alkyl, (hetero)cycloalkyl, alkenyl, (hetero)cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{3a}$, $OS(O)_2R^{3a}$, $S(O)_2R^{3a}$, $OR^{3a}$, $C(O)R^{3a}$, $C(O)OR^{3a}$, $NR^{3a}R^{3b}$, and $NC(O)R^{3a}R^{3b}$;
$R^2$ is selected from the group consisting of H, CN, F, $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, $C_7$-$C_{13}$ aralkyl, $S(O)_2OR^3$, $OS(O)_2R^3$, $S(O)_2R^3$, $OR^3$, $C(O)R^3$, $C(NR^3)R^4$, $C(O)$ $OR^3$, $NR^3R^4$, $NC(O)R^3$, $P(O)R^3R^4$, and $SiR^3R^4R^5$, wherein alkyl, (hetero)cycloalkyl, alkenyl, (hetero) cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{3a}$, $OS(O)_2R^{3a}$, $S(O)_2R^{3a}$, $OR^{3a}$, $C(O)R^{3a}$, $C(O)OR^{3a}$, $NR^{3a}R^{3b}$, and $NC(O)R^{3a}R^{3b}$;
$R^3$, $R^4$, $R^5$, $R^{3a}$, and $R^{3b}$ are independently from each other selected from the group consisting of H, $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, and $C_7$-$C_{13}$ aralkyl, wherein alkyl, (hetero)cycloalkyl, alkenyl, (hetero)cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{3c}$, $OS(O)_2R^{3c}$, $S(O)_2R^{3c}$, $OR^{3c}$, $C(O)R^{3c}$, $C(O)OR^{3c}$, $NR^{3c}R^{3d}$, and $NC(O)R^{3c}R^{3d}$;
$R^{3c}$ and $R^{3d}$ are selected independently from each other from the group consisting of H, $C_1$-$C_{10}$ alkyl, $C_3$-$C_6$ (hetero)cycloalkyl, $C_2$-$C_{10}$ alkenyl, and $C_5$-$C_7$ (hetero)aryl, wherein alkyl, (hetero)cycloalkyl, alkenyl, and (hetero)aryl may be substituted by one or more substituents selected from the group consisting of F and CN;
$A^1$ is selected from the group consisting of $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, $C_7$-$C_{13}$ aralkyl, $OR^6$, $C(O)R^6$, $C(NR^6)$ $R^7$ and $C(O)OR^6$, wherein alkyl, (hetero)cycloalkyl, alkenyl, (hetero)cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{6a}$, $OS(O)_2R^{6a}$, $S(O)_2R^{6a}$, OR, $C(O)OR^{6a}$, $NR^{6a}R^{6b}$, and $NC(O)$ $R^{6a}R^{6b}$;
$A^2$ is selected from the group consisting of H, $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, $C_7$-$C_{13}$ aralkyl, $OR^6$, $C(O)R^6$, $C(NR^6)R^7$ and $C(O)OR^6$, wherein alkyl, (hetero)cycloalkyl, alkenyl, (hetero)cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^6$, $OS(O)_2R^{6a}$, $S(O)_2R^{6a}$, $OR^{6a}$, $C(O)OR^{6a}$, $NR^{6a}R^{6b}$, and $NC(O)R^{6a}R^{6b}$ with the proviso that in case of $X^2$ is O or S, $A^2$ is neither H nor $OR^6$;

$R^6$, $R^7$, $R^{6a}$, and $R^{6b}$ are independently from each other selected from the group consisting of H, $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, and $C_7$-$C_{13}$ aralkyl, wherein alkyl, (hetero)cycloalkyl, alkenyl, (hetero)cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_3$-$C_7$ (hetero)aryl, $S(O)_2OR^{6c}$, $OS(O)_2R^{6c}$, $S(O)_2R^{6c}$, $OR^{6c}$, $C(O)R^{6c}$, $C(O)OR^{6c}$, $NR^{6c}R^{6d}$, and $NC(O)R^{6c}R^{6d}$;

$R^{6c}$ and $R^{6d}$ are independently from each other selected from the group consisting of H, $C_1$-$C_{10}$ alkyl, $C_3$-$C_6$ (hetero)cycloalkyl, $C_2$-$C_6$ alkenyl, and $C_5$-$C_7$ (hetero)aryl, wherein alkyl, (hetero)cycloalkyl, alkenyl, and (hetero)aryl may be substituted by one or more substituents selected from the group consisting of F and CN;

and (iv) optionally, a further additive.

2. The electrolyte composition (A) according to claim 1 wherein both $X^1$ and $X^2$ are independently from each other selected from the group consisting of $N(R^1)$ and $P(R^1)$.

3. The electrolyte composition (A) according to claim 1, wherein the compound of formula (I) is selected from the group consisting of compounds of formula (I) wherein $X^1$ and $X^2$ are independently from each other selected from the group consisting of $N(R^1)$ and $N=C(R^2)$.

4. The electrolyte composition (A) according to claim 1, wherein the compound of formula (I) is selected from the group consisting of compounds of formula (I a) wherein $X^1$ is $N(R^1)$ and $X^2$ is $N=C(R^2)$,

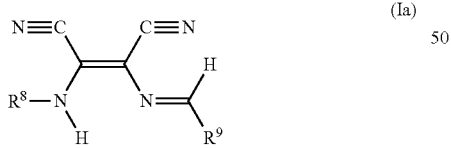

(Ia)

wherein $R^8$ is selected from the group consisting of H, $C_5$-$C_7$ (hetero)aryl and $C_7$-$C_{13}$ aralkyl, and $R^9$ is selected from the group consisting of $C_5$-$C_7$ (hetero)aryl and $C_7$-$C_{13}$ aralkyl, wherein $C_5$-$C_7$ (hetero)aryl and $C_7$-$C_{13}$ aralkyl may be substituted by one or more substituents selected from the group consisting of F, CN, $C_1$-$C_6$ alkyl, and $OR^{6a}$.

5. The electrolyte composition (A) according to claim 1, wherein the compound of formula (I) is selected from the group consisting of compounds of formula (I b) wherein $X^1$ and $X^2$ are $N(R^1)$

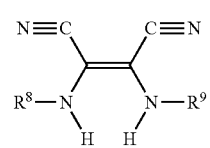

(Ib)

wherein $R^8$ is selected from the group consisting of H, $C_5$-$C_7$ (hetero)aryl and $C_7$-$C_{13}$ aralkyl, and $R^9$ is selected from the group consisting of $C_5$-$C_7$ (hetero)aryl and $C_7$-$C_{13}$ aralkyl, wherein $C_5$-$C_7$ (hetero)aryl and $C_7$-$C_{13}$ aralkyl may be substituted by one or more substituents selected from the group consisting of F, CN, $C_1$-$C_6$ alkyl, and $OR^{6a}$.

6. The electrolyte composition (A) according to claim 1, wherein the aprotic organic solvent (i) is selected from the group consisting of:

(a) a cyclic or a noncyclic organic carbonate, which may be partly halogenated, (b) a di-$C_1$-$C_{10}$-alkylether, which may be partly halogenated, (c) a di-$C_1$-$C_4$-alkyl-$C_2$-$C_6$-alkylene ether or polyether, which may be partly halogenated, (d) a cyclic ether, which may be partly halogenated, (e) a cyclic or an acyclic acetal or ketal, which may be partly halogenated, (f) an orthocarboxylic acid ester, which may be partly halogenated, (g) a cyclic or a noncyclic ester of a carboxylic acid, which may be partly halogenated, (h) a cyclic or a noncyclic sulfone, which may be partly halogenated, (i) a cyclic or a noncyclic nitrile or dinitrile, which may be partly halogenated, and (j) an ionic liquid, which may be partly halogenated.

7. The electrolyte composition (A) according to claim 1, wherein the electrolyte composition (A) comprises an aprotic organic solvent (i) that is a cyclic organic carbonate and an aprotic organic solvent (i) that is a noncyclic organic carbonate.

8. The electrolyte composition (A) according to claim 1, wherein the conducting salt (ii) is selected from the group consisting of:

$Li[F_{6-x}P(C_yF_{2y+1})_x]$, wherein x is an integer in the range from 0 to 6 and y is an integer in the range from 1 to 20;

$Li[B(R^I)_4]$, $Li[B(R^I)_2(OR^{II}O)]$ and $Li[B(OR^{II}O)_2]$ wherein each $R^I$ is independently from each other selected from the group consisting of F, Cl, Br, I, $C_1$-$C_4$ alkyl, $C_2$-$C_4$ alkenyl, and $C_2$-$C_4$ alkynyl, wherein alkyl, alkenyl, and alkynyl may be substituted by one or more $OR^{III}$, wherein $R^{III}$ is selected from the group consisting of $C_1$-$C_6$ alkyl, $C_2$-$C_6$ alkenyl, and $C_2$-$C_6$ alkynyl, and ($OR^{II}O$) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via both oxygen atoms with the central B-atom;

$LiClO_4$; $LiAsF_6$; $LiCF_3SO_3$; $Li_2SiF_6$; $LiSbF_6$; $LiAlCl_4$, lithium tetrafluoro (oxalato) phosphate; lithium oxalate; and a salt of formula $Li[Z(C_nF_{2n+1}SO_2)_m]$, where m and n are defined as follows:

m=1 when Z is selected from the group consisting of oxygen and sulfur, m=2 when Z is selected from the group consisting of nitrogen and phosphorus, m=3 when Z is selected from the group consisting of carbon and silicon, and n is an integer in the range from 1 to 20.

9. The electrolyte composition (A) according to claim 1, wherein the electrolyte composition (A) further comprises at least one additive (iv) which is selected from the group consisting of vinylene carbonate and its derivatives, vinyl ethylene carbonate and its derivatives, methyl ethylene carbonate and its derivatives, lithium (bisoxalato) borate, lithium difluoro (oxalato) borate, lithium tetrafluoro (oxalato) phosphate, lithium oxalate, 2-vinyl pyridine, 4-vinyl pyridine, cyclic exo-methylene carbonates, sultones, organic esters of inorganic acids, acyclic and cyclic alkanes having a boiling point at 1 bar of at least 36° C., and aromatic compounds, optionally halogenated cyclic and acyclic sulfonylimides, optionally halogenated cyclic and acyclic phosphate esters, optionally halogenated cyclic and acyclic phosphines, optionally halogenated cyclic and acyclic phosphites, optionally halogenated cyclic and acyclic phosphazenes, optionally halogenated cyclic and acyclic silylamines, optionally halogenated cyclic and acyclic halogenated esters, optionally halogenated cyclic and acyclic amides, optionally halogenated cyclic and acyclic anhydrides, ionic liquids, and optionally halogenated organic heterocycles.

10. The electrolyte composition (A) according to claim 1, wherein the concentration of the compound of formula (I) is 0.001 to 10 wt.-%, based on the total weight of the electrolyte composition (A).

11. An electrochemical cell comprising
(A) the electrolyte composition according to claim 1,
(B) a cathode comprising a cathode active material, and
(C) an anode comprising an anode active material.

12. The electrochemical cell according to claim 11, wherein the electrochemical cell is a secondary lithium ion battery.

13. The electrochemical cell according to claim 11, wherein at least one cathode active material comprises a material capable of occluding and releasing lithium ions selected from the group consisting of lithiated transition metal phosphates and lithium ion intercalating transition metal oxides.

14. The electrochemical cell according to claim 11, wherein the anode active material comprises a lithium ion intercalating material selected from the group consisting of lithium ion intercalating carbonaceous material, lithium ion intercalating oxides of Ti, and lithium ion uptaking silicon.

15. An electrolyte composition (A) comprising:
(i) an aprotic organic solvent;
(ii) a conducting salt;
(iii) a compound of formula (I)

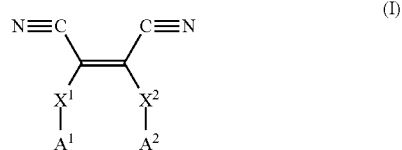

(I)

wherein
$X^1$ is selected from $N(R^1)$, $P(R^1)$, oxygen, and sulfur;
$X^2$ is $N=C(R^2)$;

$R^1$ is selected from the group consisting of H, $C_1$-$C_{10}$ alkyl, $C_3$-$C_6$ (hetero)cycloalkyl, $C_2$-$C_{10}$ alkenyl, $C_6$-$C_6$ (hetero)cycloalkenyl, $C_2$-$C_6$ alkynyl, $C_5$-$C_7$ (hetero)aryl, $C_7$-$C_{13}$ aralkyl, $OR^3$, $C(O)R^3$, $C(NR^3)R^4$, and $C(O)OR^3$, wherein alkyl, (hetero)cycloalkyl, alkenyl, (hetero)cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{3a}$, $OS(O)_2R^{3a}$, $S(O)_2R^{3a}$, $OR^{3a}$, $C(O)R^{3a}$, $C(O)OR^{3a}$, $NR^{3a}R^{3b}$, and $NC(O)R^{3a}R^{3b}$;

$R^2$ is selected from the group consisting of H, CN, F, $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, $C_7$-$C_{13}$ aralkyl, $S(O)_2OR^3$, $OS(O)_2R^3$, $S(O)_2R^3$, $OR^3$, $C(O)R^3$, $C(NR^3)R^4$, $C(O)OR^3$, $NR^3R^4$, $NC(O)R^3$, $P(O)R^3R^4$, and $SiR^3R^4R^5$, wherein alkyl, (hetero)cycloalkyl, alkenyl, (hetero)cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{3a}$, $OS(O)_2R^{3a}$, $S(O)_2R^{3a}$, $OR^{3a}$, $C(O)R^{3a}$, $C(O)OR^{3a}$, $NR^{3a}R^{3b}$, and $NC(O)R^{3a}R^{3b}$;

$R^3$, $R^4$, $R^5$, $R^{3a}$, and $R^{3b}$ are independently from each other selected from the group consisting of H, $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkenyl, $C_5$-$C_7$ (hetero)aryl, and $C_7$-$C_{13}$ aralkyl, wherein alkyl, (hetero)cycloalkyl, alkenyl, (hetero)cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{3c}$, $OS(O)_2R^{3c}$, $S(O)_2R^{3c}$, $S(O)_2R^{3c}$, $C(O)R^{3c}$, $OR^{3c}$, $C(O)OR^{3c}$, $NR^{3c}R^{3d}$, and $NC(O)R^{3c}R^{3d}$;

$R^{3c}$ and $R^{3d}$ are selected independently from each other from the group consisting of H, $C_1$-$C_{10}$ alkyl, $C_3$-$C_6$ (hetero)cycloalkyl, $C_2$-$C_{10}$ alkenyl, and $C_5$-$C_7$ (hetero)aryl, wherein alkyl, (hetero)cycloalkyl, alkenyl, and (hetero)aryl may be substituted by one or more substituents selected from the group consisting of F and CN;

$A^1$ is selected from the group consisting of $C_1$-$C_{10}$ alkyl, $C_3$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, $C_7$-$C_{13}$ aralkyl, $OR^6$, $C(O)R^6$, $C(NR^6)R^7$ and $C(O)OR^6$, wherein alkyl, (hetero)cycloalkyl, alkenyl, (hetero)cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{6a}$, $OS(O)_2R^{6a}$, $S(O)_2R^{6a}$, $OR^{6a}$, $C(O)OR^{6a}$, $NR^{6a}R^{6b}$, and $NC(O)R^{6a}R^{6b}$;

$A^2$ is selected from the group consisting of H, $C_1$-$C_{10}$ alkyl, $C_6$-$C_6$ (hetero)cycloalkyl, $C_2$-$C_{10}$ alkenyl, $C_3$-$C_6$ (hetero)cycloalkenyl, $C_2$-$C_6$ alkynyl, $C_5$-$C_7$ (hetero)aryl, $C_7$-$C_{13}$ aralkyl, $OR^6$, $C(O)R^6$, $C(NR^6)R^7$ and $C(OR^6)$, wherein alkyl, (hetero)cycloalkyl, alkenyl, (hetero)cycloalkenyl, alkynyl, (hetero)aryl, and aralkyl may be substituted by one or more substituents selected from the group consisting of F, CN, $C_1$-$C_6$ alkyl, $C_3$-$C_6$ (hetero)cycloalkyl, $C_2$-$C_6$ alkenyl, $C_5$-$C_7$ (hetero)aryl, $S(O)_2OR^{6a}$, $OS(O)_2R^{6a}$, S(O)$_2$R$^{6a}$, OR$^{6a}$, C(O)OR$^{6a}$, NR$^{6a}$R$^{6b}$, and NC(O)R$^{6a}$R$^{6b}$ with the proviso that in case of X$^2$ is O or S, A$^2$ is neither H nor OR$^6$;

R$^6$, R$^7$, R$^{6a}$, and R$^{6b}$ are independently from each other selected from the group consisting of H, C$_1$-C$_{10}$ alkyl, C$_3$-C$_6$ (hetero)cycloalkyl, C$_2$-C$_{10}$ alkenyl, C$_3$-C$_6$ (hetero)cycloalkenyl, C$_2$-C$_6$ alkynyl, C$_5$-C$_7$ (hetero)aryl, and C$_7$-C$_{13}$ aralkyl, wherein alkyl, (hetero)cycloalkyl, alkenyl, (hetero)cycloalkenyl, alkynyl, (hetero)aryl, and aralkyl may be substituted by one or more substituents selected from the group consisting of F, CN, C$_1$-C$_6$ alkyl, C$_3$-C$_6$ (hetero)cycloalkyl, C$_1$-C$_6$ alkenyl, C$_5$-C$_7$ (hetero)aryl, S(O)$_2$OR$^{6c}$, OS(O)$_2$R$^{6c}$, S(O)$_2$R$^{6c}$, OR$^{6c}$, C(O)R$^{6c}$, C(O)OR$^{6c}$, NR$^{6c}$R$^{6d}$, and NC(O)R$^{6c}$R$^{6d}$;

R$^{6c}$ and R$^{6d}$ are independently from each other selected from the group consisting of H, C$_1$-C$_{10}$ alkyl, C$_3$-C$_6$ (hetero)cycloalkyl, C$_1$-C$_6$ alkenyl, and C$_5$-C$_7$ (hetero)aryl, wherein alkyl, (hetero)cycloalkyl, alkenyl, and (hetero)aryl may be substituted by one or more substituents selected from the group consisting of F and CN;

and (iv) optionally, a further additive.

16. The electrolyte composition (A) according to claim 15, wherein the aprotic organic solvent (i) is selected from the group consisting of:
  (a) a cyclic or a noncyclic organic carbonate, which may be partly halogenated,
  (b) a di-C$_1$-C$_{10}$-alkylether, which may be partly halogenated,
  (c) a di-C$_1$-C$_4$-alkyl-C$_2$-C$_6$-alkylene ether or polyether, which may be partly halogenated,
  (d) a cyclic ether, which may be partly halogenated,
  (e) a cyclic or an acyclic acetal or ketal, which may be partly halogenated,
  (f) an orthocarboxylic acid ester, which may be partly halogenated,
  (g) a cyclic or a noncyclic ester of a carboxylic acid, which may be partly halogenated,
  (h) a cyclic or a noncyclic sulfone, which may be partly halogenated,
  (i) a cyclic or a noncyclic nitrile or dinitrile, which may be partly halogenated, and
  (j) an ionic liquid, which may be partly halogenated.

17. The electrolyte composition (A) according to claim 15, wherein the electrolyte composition (A) comprises an aprotic organic solvent (i) that is a cyclic organic carbonate and an aprotic organic solvent (i) that is a noncyclic organic carbonate.

18. The electrolyte composition (A) according to claim 15, wherein the conducting salt (ii) is selected from the group consisting of:

Li[F$_{6-x}$P(C$_y$F$_{2y+1}$)$_x$], wherein x is an integer in the range from 0 to 6 and y is an integer in the range from 1 to 20;

Li[B(R$^I$)$_4$], Li[B(R$^I$)$_2$(OR$^{II}$O)] and Li[B(OR$^{II}$O)$_2$] wherein each R$^I$ is independently from each other selected from the group consisting of F, Cl, Br, I, C$_1$-C$_4$ alkyl, C$_2$-C$_4$ alkenyl, and C$_2$-C$_4$ alkynyl, wherein alkyl, alkenyl, and alkynyl may be substituted by one or more OR$^{III}$, wherein R$^{III}$ is selected from the group consisting of C$_1$-C$_6$ alkyl, C$_2$-C$_6$ alkenyl, and C$_2$-C$_6$ alkynyl, and (OR$^{II}$O) is a bivalent group derived from a 1,2- or 1,3-diol, a 1,2- or 1,3-dicarboxlic acid or a 1,2- or 1,3-hydroxycarboxylic acid, wherein the bivalent group forms a 5- or 6-membered cycle via both oxygen atoms with the central B-atom;

LiClO$_4$; LiAsF$_6$; LiCF$_3$SO$_3$; Li$_2$SiF$_6$; LiSbF$_6$; LiAlCl$_4$, lithium tetrafluoro (oxalato) phosphate; lithium oxalate; and a salt of formula Li[Z(C$_n$F$_{2n+1}$SO$_2$)$_m$], where m and n are defined as follows:
  m=1 when Z is selected from the group consisting of oxygen and sulfur,
  m=2 when Z is selected from the group consisting of nitrogen and phosphorus,
  m=3 when Z is selected from the group consisting of carbon and silicon, and
  n is an integer in the range from 1 to 20.

19. The electrolyte composition (A) according to claim 15, wherein the electrolyte composition (A) further comprises at least one additive (iv) which is selected from the group consisting of vinylene carbonate and its derivatives, vinyl ethylene carbonate and its derivatives, methyl ethylene carbonate and its derivatives, lithium (bisoxalato) borate, lithium difluoro (oxalato) borate, lithium tetrafluoro (oxalato) phosphate, lithium oxalate, 2-vinyl pyridine, 4-vinyl pyridine, cyclic exo-methylene carbonates, sultones, organic esters of inorganic acids, acyclic and cyclic alkanes having a boiling point at 1 bar of at least 36° C., and aromatic compounds, optionally halogenated cyclic and acyclic sulfonylimides, optionally halogenated cyclic and acyclic phosphate esters, optionally halogenated cyclic and acyclic phosphines, optionally halogenated cyclic and acyclic phosphites, optionally halogenated cyclic and acyclic phosphazenes, optionally halogenated cyclic and acyclic sylilamines, optionally halogenated cyclic and acyclic halogenated esters, optionally halogenated cyclic and acyclic amides, optionally halogenated cyclic and acyclic anhydrides, ionic liquids, and optionally halogenated organic heterocycles.

20. An electrochemical cell comprising
  (A) the electrolyte composition according to claim 15,
  (B) a cathode comprising a cathode active material, and
  (C) an anode comprising an anode active material.

* * * * *